United States Patent
Sandbo et al.

(10) Patent No.: US 12,475,371 B2
(45) Date of Patent: Nov. 18, 2025

(54) TECHNOLOGY STACK MODELER ENGINE FOR A PLATFORM SIGNAL MODELER

(71) Applicant: ATC Capital Partners, Portland, OR (US)

(72) Inventors: Scott Sandbo, Portland, OR (US); Ben Wilson, Portland, OR (US); Steve Lidberg, Portland, OR (US)

(73) Assignee: ATC CAPITAL PARTNERS, Portland, OR (US)

( * ) Notice: Subject to any disclaimer, the term of this patent is extended or adjusted under 35 U.S.C. 154(b) by 44 days.

(21) Appl. No.: 18/394,115

(22) Filed: Dec. 22, 2023

(65) Prior Publication Data

US 2024/0211973 A1    Jun. 27, 2024

Related U.S. Application Data

(60) Provisional application No. 63/435,165, filed on Dec. 23, 2022.

(51) Int. Cl.
| | |
|---|---|
| *G06Q 10/00* | (2023.01) |
| *G06N 3/08* | (2023.01) |
| *G06Q 30/0201* | (2023.01) |

(52) U.S. Cl.
CPC .......... *G06N 3/08* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 2003/0135516 A1* | 7/2003 | Goodwin | G06F 16/24575 |
| 2017/0109438 A1* | 4/2017 | Oliver | G06F 40/284 |
| 2017/0192414 A1* | 7/2017 | Mukkamala | H04L 63/18 |
| 2019/0278777 A1* | 9/2019 | Malik | G06F 16/9024 |
| 2019/0354544 A1* | 11/2019 | Hertz | G06N 5/025 |
| 2022/0083450 A1* | 3/2022 | Geddes | G06F 21/57 |
| 2022/0092270 A1* | 3/2022 | Scherer | G06F 3/165 |
| 2022/0261299 A1* | 8/2022 | Dhondse | G06N 5/022 |
| 2023/0177170 A1* | 6/2023 | Olson | G06N 20/00 726/25 |
| 2024/0348641 A1* | 10/2024 | Galinkin | H04L 63/1433 |

OTHER PUBLICATIONS

Thomas et al, Mining unstructured software repositories, chapter 5, 2014 (Year: 2014).*

(Continued)

*Primary Examiner* — Joseph M Waesco
(74) *Attorney, Agent, or Firm* — PERKINS COIE LLP

(57) ABSTRACT

A platform signal modeler acquires a first technology platform signal and generates, using the first technology platform signal, a synthetic signal using natural language processing. The synthetic signal includes a first token and a second token, the tokens relating to particular technology components. The modeler determines a taxonomy binding for the tokens based on a semantic distance between the tokens and generates a co-occurrence value for the taxonomy binding. The modeler augments the synthetic signal by acquiring a second technology platform signal and determining, based on the second signal, a momentum indicium that relates to the technology component.

20 Claims, 26 Drawing Sheets

(56) References Cited

OTHER PUBLICATIONS

HU et al., Userinfluenceanalysisforgithubdevelopersocialnetworks, ExpertSystemswithApplications,2018, vol. 108,p. 108-338 (Year: 2018).*
Hu et al., User influence analysis for github developer social networks, Expert Systems with Applications, 2018, vol. 108, p. 108-338.
Jiang et al., Why and how developers fork what from whom in github, Empir Software Eng (2017) 22:547-578.
Heyman et al., Neural code search revisited: enhancing code snippet retrieval through natural language intent, 2008.
Thomas et al., Mining unstructured software repositories, chapter 5, 2014.

* cited by examiner

Home Page – Followed Products & Developers

Latest Developer Discussions 726

Platform enables users to search for keywords to further filter discussion.

Search 🔍

PRODUCTS YOU FOLLOW 722
- ☑ Apache Spark
- ☑ Databricks
- ☑ Resideo
- ☑ Strimzi
- ☑ web3.js Platform allows users to subscribe/follow different products & developers.

DEVELOPERS YOU FOLLOW 724
- ☑ kaboozie
- ☑ Iliketrucks2
- ☑ Fat-boyy

Those products & developers will be saved to the user's homepage data.

Discussions can be filtered by categories below as well as Vulnerabilities and Threats ( not shown below ).

Top | Influential | Performance | Pricing | Vu ▶ 728

Most Recent ⌄    Discussions   Developers

🔊 Gunnerrrrrrr
July 2, 2022 apachespark : internal differences between read csv in spark vs
"At a high level Spark -- Lets say you have a 1 gb file and you split it into 10 smaller part files 128 mb each. Spark has driver and executors. Just for the sake of example let's say we have 5 executors, when you do read csv each executors gets two files assigned to work on. Regarding ram usage its slightly more complicated cause spark is lazy evaluated it need not load complete file at once Pandas -- (have less exp on pandas) but as Far as I know it doesn't work on distributed architecture so complete file is loaded Databricks created a library called koalas which replicates pandas api but works on distributed architecture. (More like spark) Again this of at a very high level actual architecture is slightly more complicated because executors cores , dynamic executors all come in place"

READ MORE

[Koalas] [Databricks]

🔊 Gaploid
July 2, 2022 dataengineering : databricks platform for small data is it worth it
"ClickHouse could be a good choice here. It was created for clickstream workloads initially and blazing fast on these scenarios. You can try it here [https://double.cloud](https://double.cloud) or

[ClickHouse] [Databricks]

Publicly available developer discussion data is indexed.

Relevant discussions are displayed here tied to the products and/or developers users follow.

The discussions can be filtered and sorted to help users triangulate as they research.

TECHNOLOGY STACK MODELER ENGINE FOR A PLATFORM SIGNAL MODELER

CROSS-REFERENCE TO RELATED APPLICATIONS

This application claims the benefit of U.S. Application No. 63/435,165, entitled "Analytics Environment for Technology Platform Monitoring" and filed Dec. 23, 2022, the content of which is herein incorporated in its entirety and for all purposes. This application relates to U.S. application Ser. No. 18/394,044 entitled "Developer Activity Modeler Engine for a Platform Signal Modeler" and filed Dec. 23, 2023, the content of which is herein incorporated in its entirety and for all purposes.

TECHNICAL FIELD

This application relates generally to platform signal modelers, such as artificial intelligence/machine learning (AI/ML) based technology stack simulators and modelers for technology platforms.

BACKGROUND

An entity's technology stack can include various technology products (e.g., assets and/or components, such as software, hardware, firmware, middleware, and/or combinations thereof) that, together, can comprise the entity's computing ecosystem. The products can include, for example, products that support back-end computing operations (e.g., servers, load balancers, network equipment, operating systems, database products, and/or monitoring tools) and products supporting front-end developer operations (e.g., frameworks, business intelligence (BI) tools, system development tools, and/or applications).

Two or more products in a category can be complementary (e.g., can be used together and offer complementary functionality) or substitute (e.g., can be used as alternatives). For example, in multimodal implementations of AI/ML technologies (e.g., implementations capable of storing and processing mixed-content data, such as text, images, and audio), certain database products in a first set of database products, each having a specific data model (relational, object-oriented, document, vector, graph, and so forth) can be implemented in a particular ecosystem in a complementary fashion such that each database type manages content of a particular data type, and certain base-level database products may be required as precursors to specialized, accelerated database products. To continue the example, consider a second set of database products. If a database product from the second set of database products supports multiple types of data models (e.g., as a multi-model database product), the database product from the second set could be considered a substitute product for one, several, or all products in the first set.

Technology products and ecosystems are rapidly evolving and are now increasingly scalable, adaptive, customizable, and collaborative in nature. Because technology products are increasing in complexity and points of connectivity with other products, the patterns and trends that underlie technology adoption activity are becoming less predictable. Organizational technology investment decisions therefore carry increased risks. For instance, if a technology product is not sufficiently secure, lacks the a robust developer community, or is likely to be superseded by a next-generation product, it may not be suitable to large-scale adoption. Additionally, if talent to maintain a particular technology product is scarce (e.g., if a technology product is falling out of favor with peer organizations and developers), organizations may find it difficult to find the resources to maintain the product.

BRIEF DESCRIPTION OF THE DRAWINGS

Detailed descriptions of implementations of the present invention will be described and explained through the use of the accompanying drawings.

FIG. 4A-2 shows a GUI for visualizing user-interactive aspects of a navigable product universe taxonomy in the example platform signal modeler, according to some implementations.

FIGS. 7A and 7B show GUIs for user subscription management in an example platform signal modeler, according to some implementations.

Figure 1A:
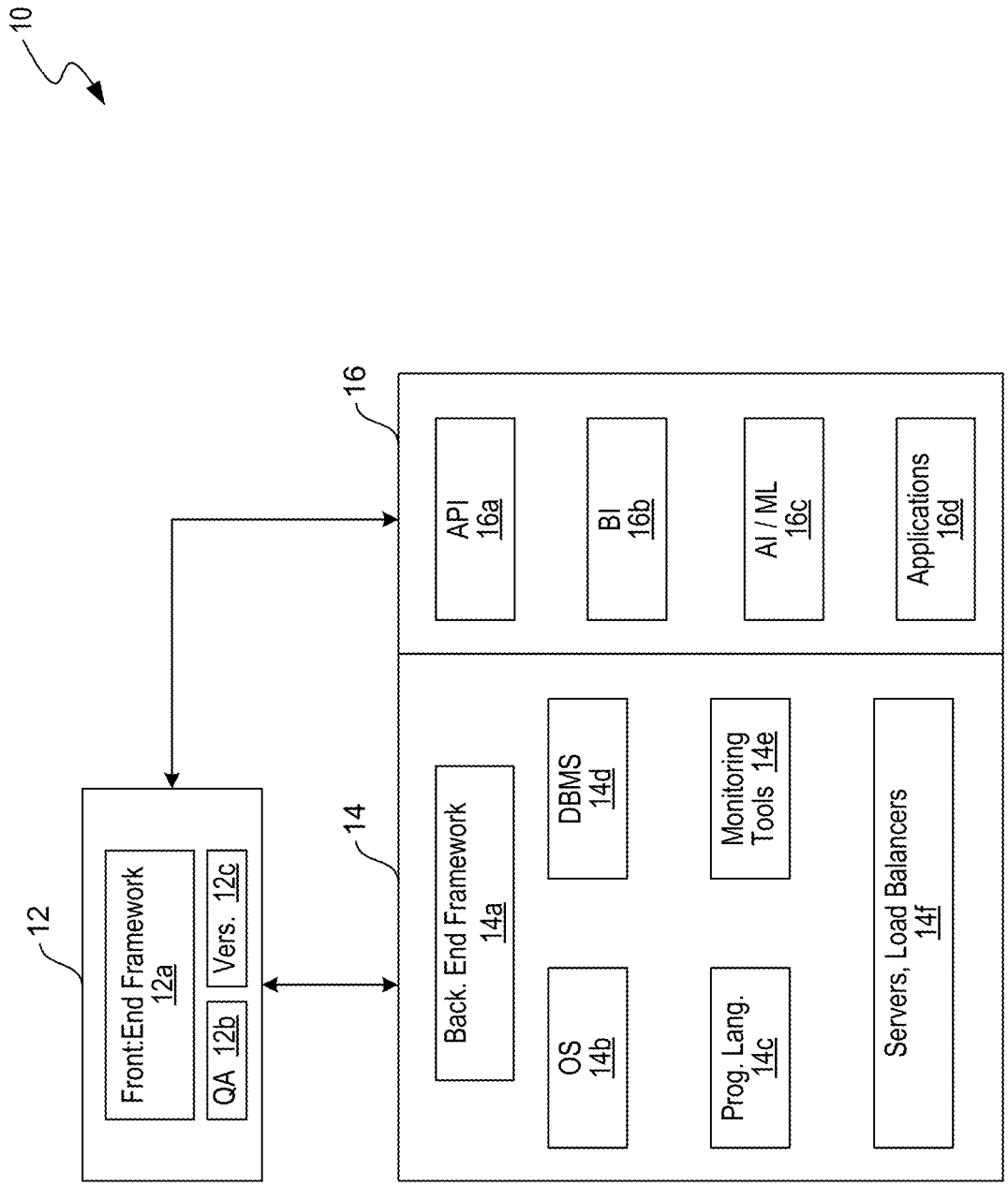
FIG. 1A is a block diagram showing a technology component stack in a technology platform, according to some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

As disclosed herein, a platform signal modeler (also sometimes referred to herein as an analytics platform, an artificial intelligence (AI) environment, or a machine learning (ML) environment) is configured to generate analytics, predictions, and/or simulations regarding various technology component stacks and technology adoption initiatives. For instance, the platform signal modeler can enable the generation of verifiable responses to such questions as "What's the projected year-on-year growth of the developer base for Product XYZ?", "What's the product usage momentum for Product XYZ at Company ABC?", "What are the trends in co-occurrence patterns for Product XYZ overall and/or at Company ABC?", "What technology initiatives is Company ABC pursuing?" "What are the next top 5 trends likely to disrupt the product usage trends for Product XYZ?", "What will the developers who use Product XYZ turn to next?" and so forth. Accordingly, the platform signal modeler can identify patterns that underlie technology initiatives and generate predictions regarding current and future adoption of technology products.

The platform signal modeler can receive platform-native data signals (e.g., via application programming interface (API) messages) and/or acquire data items (e.g., via queries, web scraping) from various platforms that provide information regarding technology products. The platforms can include, for example, code repositories, developer discussion boards, job listing sites, vulnerability reporting databases, security scorecard repositories, privacy scorecard repositories, responsible AI scorecard repositories, entity operating data (company financial databases, company legal disclosures, job listing data), and so forth.

The platform signal modeler can generate synthetic signals based on the raw signals acquired from the various platforms. For example, the platform signal modeler can process unstructured text (e.g., by executing natural language processing models, data queries, parsers, semantic search, or combinations thereof) to extract, generate, enhance, transform, and/or modify tokens (e.g., units of information 194, 198a, 198b, and/or 198c shown in FIG. 1G, and/or, more generally units of information that can include alphanumeric information, special characters, data packets and so forth). For example, a particular quantity of tokens determined based on the raw signal can be optimized into a comparatively smaller quantity of features in order to reduce the amount of memory (e.g., cache memory) and processor resources needed to execute the AI/ML operations of the platform signal modeler. Other examples of synthetic signals include metadata-enhanced items, aggregations (e.g., semantic distance value aggregations, such as averages or weighted averages, which can be time-based with the more recent values weighted more heavily), calculations, developer impact tokens (e.g., numerical representations upvotes, post counts, likes), multi-dimensional items (e.g., product relationship quantifiers, developer impact indicators (e.g., clout scores), triangulation-based indices, momentum indices) and so forth. For example, multidimensional items can be generated based on weighted or scaled dimension values (e.g., by adding or averaging the weighted or scaled dimension values for two or more dimensions).

As another technical advantage related to generating synthetic signals based on the acquired raw signals, the platform signal modeler can enable techniques to improve context-specific analytics. For example, the platform signal modeler can implement indexers (searchable structures that include item identifiers) to enhance the quality of tokens extracted from the raw input data. Further, the platform signal modeler can implement taxonomies (searchable structures that quantify and qualify determined relationships between indexed items). An example indexer can include various optimized data structures, such as product-, developer- and company-related data structures. A particular product index or taxonomy can include multidimensional product data (e.g., bindings of data elements, data elements bound (relationally associated) with one another).

An indexer can enable retrieval-augmented (indexer-augmented) generation of synthetic signals by the modeler such that the semantic quality of the tokens, extracted or generated based on raw signal data, is improved. For instance, the indexer can be cross-referenced to map a particular token to a product category or another item that enhances the semantic quality of the token. Furthermore, retrieval-augmented generation techniques can be improved, according to various implementations of the platform signal modeler. For example, tokens retrieved from raw data can correspond to various indexed items managed by the indexer, such as entity identifiers, product identifiers, code unit identifiers, and/or developer identifiers. Natural language processing models used by the platform signal modeler to process the unstructured input text can be trained to minimize incorrect mappings (e.g., false positives, false negatives) when mapping extracted informational items to existing indexed data, such as, for example, product categories. For example, extracted tokens can be modified, transformed and/or enhanced by generating and labeling the tokens with contextual metadata, by considering context windows in semantic searches, considering relationship pattern similarity, and/or via other suitable techniques for improving model accuracy. Examples of training data can include indexer data, taxonomy data, developer data, and so forth.

In one use case, natural language processing models of the platform signal modeler can, for example, distinguish between "Snowflake", a data storage product, and "snowflake", a feathery ice crystal, by considering the context window for the token "Snowflake". The context window can include a predetermined quantity of other tokens (e.g., 2,948, 4,000, 8,000, 16,000, 32,000) that co-occur with the "Snowflake" token in a particular segment of unstructured data in the input text and/or in a particular set of segments (e.g., historical versions of a particular segment, a set of related segments, segments retrieved on-demand in response to a specific request, and so forth). In some implementations, the context window can include a tunable parameter for the quantity of tokens to consider. For example, the tunable parameter can be set to a comparatively smaller quantity of tokens to consider (e.g., 5, 10, 20, 50, 100, 200, 1,000 or fewer) to accelerate inference and training of the models. In various implementations, tunable token quantity thresholds for context windows can be subscriber-specific and/or model-specific and can offer additional technical advantages, such as parameter tuning to optimize the generation of synthetic items and/or tuning of data analytic operations improve precision of classification model outputs in automatically identifying previously un-indexed items. Similarly, separate synthetic data such as inferences regarding product relationship similarity and or taxonomical similarity can be referenced to improve classification speed and accuracy. These operations are described throughout this disclosure—for example, in relation to FIG. 1E. Context windows can include look-back periods.

In some implementations, the platform signal modeler can further modify and/or transform the tokens and/or synthetic signals (e.g., collections, aggregations, or transformations of tokens) in order to generate feature maps and/or feature vectors. Accordingly, the feature vectors can include various tokens, synthetic signals and/or computations. For instance, the tokens can be augmented by generating attributes, such as product similarity measures 150d (shown in FIG. 1F), product similarity probabilities, related product identifiers, ordered related product identifiers, product version sequences and scores, product relationship strength quantifiers, product-specific developer reputation scores, and so forth. These items are illustrated, for example, in relation to FIG. 1E (shown as vector embeddings 145c), FIG. 4E, FIG. 5A, and FIG. 7A). In some implementations, the attributes can be associated with the tokens in the form of metadata, key-value pairs, linked database tables, and so forth. Using the derived attributes, together with the underlying tokens and/or synthetic signals, the modeler can generate vector embeddings and vectorize the items for use by downstream models.

An example platform signal modeler can include an application instance made available to a subscriber entity as a pre-installed executable application, a web-based application accessible and executable via a browser, a web page accessible via a browser, or as a combination of the above. In some implementations, the application instance enables subscriber entities to parametrize the signal acquisition operations and/or customize the underlying models. For example, a particular implementation of a platform signal modeler can accept a parameter set to acquire data from a particular target platform. As another example, a particular implementation of the platform signal modeler can accept a parameter set that causes the models of the platform signal modeler to generate synthetic signals and/or attributes in a particular manner. For instance, a parameter set can include a subscriber-specific set of training data, which can, for example, include tunable definitions for relationship strength quantifiers, top developer cohorts, and so forth. As another example, a subscriber-specific parameter set can include tunable feature definitions and/or indexer dictionaries, such as subscriber-specific product categories, subscriber-specific "watch" items (e.g. security vulnerability descriptors), custom weights for the subscriber-specific "watch" items, and so forth.

The platform signal modeler can include one or more engines that enable subscriber entities to generate and access technology-product related insights from a plurality of otherwise disconnected sources of data. The engines can include one or more web crawlers, customized API endpoints, and or bulk-data processing methods configured to collect input signal data. The data acquisition modules can provide a technical advantage by intelligently targeting content to be acquired, thereby reducing data acquisition time and ensuring stronger downstream signal by increasing top-level relevance. In some implementations, data acquisition operations can be sequenced and/or scheduled during anticipated off-peak times determined, for example, by periodically sampling the target source system's response time, upload link speed, and/or the like. The acquisition modules can also automatically adjust rates of ingestion in response to API rate limits and other endpoint load concerns. The engines can include an extraction engine and/or an indexer, which can pre-process the collected raw data according to parameters in an indexing store and feed the raw data to a foundational modeling engine and/or an application modeling engine, as described above.

The engines can include various subscriber-interactive visualizers. A particular visualizer can include or be configured to work in conjunction with a configurable presentation layer, one or more data structures, computer-executable code, and event handlers. Visualizers provide a technical advantage of optimizing data for access and presentation— for example, by extracting or generating items using separate native data streams which are not natively capable of being combined (e.g. developer usage data normalized across multiple signal endpoints and unified by individual), in a meaningful fashion, in a single user interface.

As an example use case, the signal modeler can generate inferences regarding a relationship between a post (e.g., a post including a narrative) on a developer discussion board where a developer (e.g., identified by an account handle or another identifier) describes a technical problem with Product XYZ and an entry in a vulnerability database, such as the National Vulnerability Database (NVD), that codifies a particular type of a cybersecurity threat but does not relate the threat specifically to Product XYZ. For example, the signal modeler can extract a first set of keywords from a first input item (e.g., a blog or discussion board post), extract a second set of keywords from a second input item (e.g., NVD), vectorize the keywords, and determine similarity measures 150d for the keywords to infer an indication of vulnerability not expressly mentioned in the blog post. As another example use case, the signal modeler can generate inferences regarding top N developers for Product XYZ based on, for example, a count of posts, user reactions (upvotes and/or code forks) associated with developer identifiers in raw data signals, where the developers mention a product in a particular context (e.g., with a particular set of action keywords).

Visualizers can also optimize data display operations based on a particular subscriber device's display parameters to accommodate small screens. Further, visualizers can be pre-programmed to take advantage of touchscreen-native event handlers (e.g., detection of double-tapping, zooming in) and respond to them by automatically providing additional relevant data, in a display-optimized fashion, without navigating away from a particular user interface.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Technology Component Stack

FIG. 1A is a block diagram showing a technology component stack 10, according to some implementations. One of skill will appreciate that various elements of the technology component stack 10 can be enhanced, combined and/or omitted without departing from the spirit of the instant disclosure. The technology component stack 10 includes components (e.g., equipment, products, assets, and so forth), which can include software, hardware, firmware, middleware, and/or combinations thereof. Various combinations of these items can comprise a particular entity's computing ecosystem.

As shown, the technology component stack 10 can include front-end developer components 12, back-end components 14, and/or client components 16. Front-end developer components 12 can include, for example, front-end frameworks 12a, quality assurance management tools 12b, and/or code versioning tools 12c. Front-end frameworks 12a (e.g., React, Bootstrap, jQuery, Emberjs, Backbonejs) include executables to build the user experience, such as user interfaces and client-side product functionality. Quality assurance management tools 12b (e.g., Jira, Zephyr) enable testing of various executables. Code versioning tools 12c (e.g., Git, ClearBase) enable tracking and management of changes in code, including executable code. Back-end components 14 can include, for example, back-end frameworks 14a, operating systems 14b, programming language environments 14c, database management systems 14d, monitoring tools 14e, and/or servers/load balancers 14f. Back-end frameworks 14a (e.g., Ruby, Django, .NET) include libraries and utilities designed to help developers build applications and can include, for example, database connectors, request handlers, authentication managers, and so forth. Operating systems 14b (e.g., Linux, iOS, Android) support task scheduling, resource allocation, application management, control of peripherals and other core functions of a computing system. Programming language environments 14c (e.g., Java) enable developers to write or otherwise create and compile code, such as application code. Database management systems 14d (e.g., MySQL, MongoDB) enable storage, management, indexing, and access to data. Monitoring tools 14e (e.g., AppDynamics) enable analytics related to technical performance and system health of other components of the stack 10. Servers/load balancers 14f (e.g., stand-alone connected servers, server clusters, and/or cloud-based services, such as AWS) include servers, content distribution networks, routing, and/or caching services. Client components 16 can include, for example, APIs 16a and related infrastructure (e.g., web servers, gateway servers), business intelligence tools 16b, AI/ML tools 16c, and/or applications 16d.

Various components of the technology component stack 10 can evolve over time and include additional items not described herein, which can be detectable by the platform signal modeler of the instant disclosure. For example, in the rapidly evolving field of AI/ML tools 16c, product components can include foundational models and frameworks, orchestration tools, vector databases, model tuning and optimization tools, data labeling tools, synthetic data generators, model safety analyzers, AI/ML observability tools, and/or other components that become suitable for implementation as the technical field matures. Accordingly, the techniques described in the present disclosure can enable monitoring, identification, and/or simulation of existing systems and/or new systems.

Figure 1B:
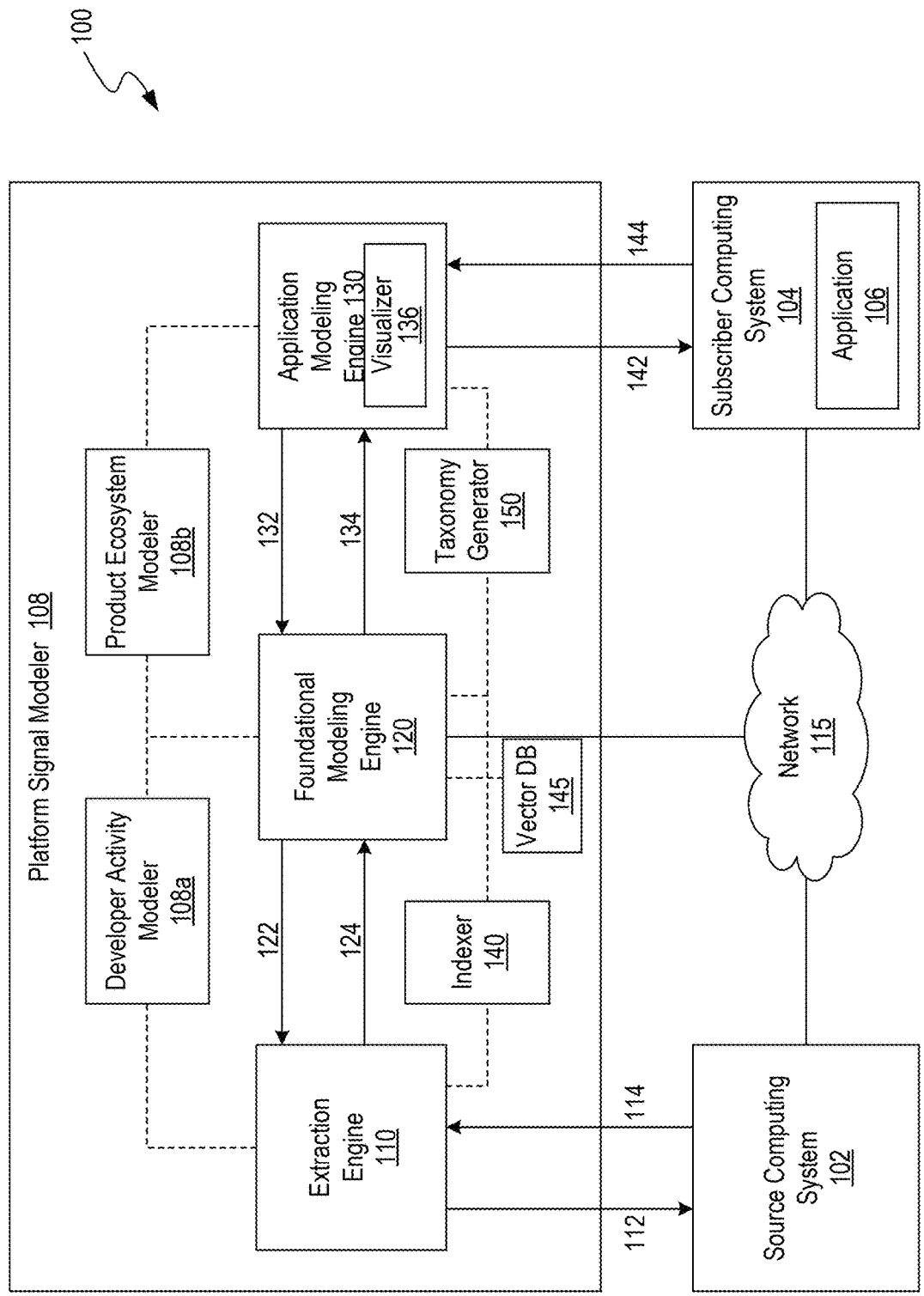
FIG. 1B is a block diagram showing a platform signal modeler (e.g., a modeler for monitoring and simulation of technology components stacks), according to some implementations.

To that end, components of the technology component stack 10 can be communicatively coupled to the elements of the platform signal modeler 108 of FIG. 1B. For example, a particular component or set of components can comprise the source computing system 102 that provides signals regarding operations of various components. The signals can include, for example, monitoring data, network traffic data, application traffic data, system health statistics, uptime statistics, component identifying information (IP addresses, MAC addresses, transceiver hardware identifiers and so forth), AI/ML model performance metrics (e.g., precision values, recall values, mean square error values, accuracy values, confusion matrices), and/or other platform signal information. Further information regarding components of the technology component stack 10 can be provided by additional source computing systems 102, as described further herein. In some implementations, the signals generated by various components of the technology component stack 10 can be augmented, aggregated, and/or simulated using additional signals received from additional source computing systems 102, such as developer forums and security vulnerabilities.

Platform Signal Modeler

FIG. 1B is a block diagram showing a computing environment 100. As a general overview, the computing environment 100 can enable entities, such as subscriber entities that operate one or more subscriber computing systems 104, to access resources (e.g., signal representations in computer-readable and/or human-readable form, visualizers, other computer-executable code, AI/ML models, and/or the like) on a particular instance of a platform signal modeler 108. An example subscriber entity can be an organization that uses or invests in technology products and/or services. The subscriber entity can be in a vendee-vendor, recipient-provider or similar business relationship with an entity that provides and/or manages the platform signal modeler 108. The platform signal modeler 108 can receive technology platform signals from various source computing system 102, source product-related data from a plurality of source computing systems 102, perform foundational data modeling operations to optimize the sourced data, perform application-specific modeling operations to structure and feed data to visualizers, and provide the relevant visualizers to subscriber computing systems 104.

The platform signal modeler 108 can include dedicated and/or shared (multi-tenant) components and can be implemented, at least in part, as a virtual or cloud-based environment. For example, in some embodiments, the platform signal modeler 108 can host and/or manage a subscriber-specific application instance, shown as the application 106 provided to a subscriber computing system 104. Accordingly, the platform signal modeler 108 can allow subscriber entities to execute computer-based code without provisioning or managing infrastructure, such as memory devices, processors, and the like. In some embodiments, the computing resources needed for a particular computing operation can be assigned at runtime.

The platform signal modeler 108 can include various engines. As used herein, the term "engine" refers to one or more sets of computer-executable instructions, in compiled or executable form, that are stored on non-transitory computer-readable media and can be executed by one or more processors to perform software- and/or hardware-based computer operations. The computer-executable instructions can be special-purpose computer-executable instructions to perform a specific set of operations as defined by parametrized functions, specific configuration settings, special-purpose code, and/or the like.

The engines described herein can include machine learning models, which refer to computer-executable instructions, in compiled or executable form, configured to facilitate ML/AI operations. Machine learning models can include one or more convolutional neural networks (CNN), deep learning (DL) models, translational models, natural language processing (NLP) models, computer vision-based models, large-language models (LLMs) or any other suitable models for enabling the operations described herein. The machine learning models can be arranged as described, for example, in relation to FIG. 3.

The engines described herein can include visualizers. For example, the application modeling engine 130 can include product metric visualizers, talent pool visualizers, and/or the like. Visualizers can be thought of as computer-based entities that enable subscriber access and interaction with the analytical tools provided by the platform signal modeler 108.

An example visualizer can include a configurable presentation layer, one or more data structures, computer-executable code, and event handlers. The configurable presentation layer can display, in an interactive fashion, graphs, charts, images and/or the like. For example, a product universe visualizer can include a plurality of product nodes. The attributes of each product node, such as color, size, placement, connector positioning, connector thickness, and/or the like can be programmatically set based on product attributes in the underlying data structure. Nodes or other objects in the configurable presentation layer (e.g., tables, node connectors, records, images, icons, buttons and/or other items) can be programmatically bound to event handlers that include computer-executable code. The event handlers can be configured to generate and/or retrieve data upon detecting a user interaction with an object, zoom in on a displayed object, reposition a displayed object on a display interface, allow users to subscribe to underlying data feeds, and/or the like. One of skill will appreciate that computer-executable code included in visualizers is not limited to event handlers and can be configured to generate and display components of the configurable presentation layer, retrieve and/or generate the relevant data, receive and process user inputs, and/or the like.

In operation, the extraction engine 110 of the platform signal modeler 108 is configured to receive and/or access data from one or more source computing systems 102. In some implementations, the extraction engine 110 generates a raw data query 112 and transmits the raw data query 112 to a particular source computing system 102. In some implementations, the extraction engine 110 includes a web crawler, a web scraper, customized API ingestion method, or a similar component that returns and retrievably stores raw data from the relevant systems. In such cases, the raw data query 112 is executed against a data store within the platform signal modeler 108 to extract the relevant variables and information from the raw data.

The raw data query can be parametrized based on information included in a data store associated with the indexer 140. The indexer 140 includes categorization and/or parameter information, such as a source computing system 102 URL (an API or another interface engine URL), a search keyword (e.g., product, developer), a time-related parameter (e.g., for sourcing discussion forum posts), associated metadata (code repository URLs, user-generated tags) and/or the like.

The indexer 140 can, more generally, include suitable product attributes, such as company, vertical, product name, company grouping, open-source project identifier, repo information, scan type, business type, commercial version, product category, discussion forum tags, related products, company rank, programming language, predefined parameters for a SQL pull from website scraping data, topic, descriptor tags, company URL, company social media handle, careers URL, sponsor organization, image address for logos and similar resources, product acquirer information, internal watchlist map, funding information, product search string, issue search string, company search string, open-source project search string, and/or the like. The indexer 140 can enable retrieval-augmented generation of synthetic signals. For example, any of the product attributes managed by the indexer 140 can be included in metadata for informational items, in feature vectors, and/or in labels for training datasets. Accordingly, the models that classify the informational items can, for example, be trained using labeled training datasets that include the above-described items.

Signals are received and/or data is sourced from source computing systems 102. One example of a source computing system 102 is a discussion board or forum, such as Reddit, Twitter, HackerNews, Discord, product-specific support forums and so on. The data collected, via platform signal 114, from a discussion board or forum can include posts related to a product, upvotes related to a product, and the like. Another example of a source computing system 102 is a code repository and/or code exchange platform, such as StackOverflow, GitLab, and/or GitHub. The data collected, via platform signal 114, from a code repository can include code forks, reported issues, code commits, and/or the like. Another example of a source computing system 102 comprises company-specific career sites, and/or job aggregators such as LinkUp, LinkedIn, Glassdoor, and so on. The data collected, via platform signal 114, from a job listings site can include raw listings and/or the like. Other examples of source computing systems 102 include one or more data stores that retrievably store usage information regarding the platform signal modeler 108, company internal channels, package managers (npm, PyPI), social media channels, crowdsourced information stores, and/or the like. The source computing systems 102 can also include any of the components (12n, 14n, 16n), or component groups (12, 14, 16) of FIG. 1A.

In some implementations, the extraction engine 110 performs data pre-processing to optimize the data collected via platform signal 114 for feeding it to the foundational modeling engine 120. Data pre-processing can include, for example, executing a natural language processing model (e.g., a model structured according to the example of FIG. 3) to extract and/or generate informational items from the input signal. Data-preprocessing can also include retrieval-augmented generation of synthetic signals using the indexer 140. For example, for a particular informational item extracted from the raw signal, such as unstructured text in a developer blog post, the indexer can be used as an ontology to cross-reference a list of synonyms, product identifiers, product categories, and so forth. These items can be bound to the informational item in the form of metadata, which can be quantized and vectorized to facilitate processing by downstream models, as described further herein.

Pre-processing operations can further include generating or updating, based on the data collected via platform signal 114, a keyword set for an AI/ML component of the foundational modeling engine 120, a list of curated endpoints, a list of company-to-industry associations, and/or the like. These items can be stored in a data store associated with the indexer 140 and provided as feature inputs 124 (e.g., in the form of quantized vector embeddings) to the foundational modeling engine 120 and/or application modeling engine 130. In some embodiments, the extraction engine 110 provides the feature inputs 124 to the foundational modeling engine 120 in a push fashion. In some embodiments, the extraction engine 110 provides the feature inputs 124 to the foundational modeling engine 120 in response to a query feature request 122 received from the foundational modeling engine 120. In some implementations, the extraction engine 110 stores the feature inputs 124 in the vector database 145.

An example feature input 124 record in the vector database 145 can include, for example, an informational item and/or quantized embeddings associated with the informational item (e.g., metadata determined or generated for the informational item). More generally, the vector database 145 can store feature inputs 124 and/or post-processed feature inputs 134. The feature inputs 124 can be optimized for processing by AI/ML models to derive, for example, foundational measures, such as developer- and product-related metrics. The post-processed feature inputs 134 can further include, in vectorized form, informational items stored relationally to additional embeddings (quantized items), such as measures of product relationships, sentiment indicators, product similarity maps, and so forth.

The foundational modeling engine 120 is configured to determine or generate, using the feature inputs 124, foundational measures of product-related and/or developer-related activity. The foundational modeling engine 120 can utilize suitable statistical and/or AI/ML analysis tools, such as time series analysis, rank and compare, overlap analysis, classification models, and the like. The foundational measures can include, for example, product-related statistics and insights, developer-related statistics and insights, momentum indexes/indicia, product traction information, consolidated product perspectives, product user sentiment, vulnerability statistics and insights, issue information statistics and insights, and/or the like.

The application modeling engine 130 is configured to determine or generate, using the feature inputs 124 and/or post-processed feature inputs 134, various enhanced synthetic signals, such as measures of product relationships, sentiment indicators, product similarity maps, and so forth, according to various configuration settings. For example, configuration settings can be subscriber-specific and can include tunable thresholds, tunable parameters (e.g., quantity of informational items to consider), tunable definitions for relationship strength quantifiers (e.g., tunable definitions for weight factors for dimensions of the quantifiers, where the dimensions can include frequency of co-occurrence (or other product interrelationship) indicia, semantic distance at co-occurrence, quality (e.g., developer reputation) of source signal, etc.), tunable definitions for identifying top developer cohorts (e.g., based on post counts, number post upvotes, number of code fork counts) for momentum calculations, and so forth. By applying tunable parameters to the feature inputs 124 and/or post-processed feature inputs 134, the application modeling engine 130 can enable subscriber entities to tune the AI/ML models to achieve, based on a selection of values for parameters and/or thresholds, a desired level of precision, recall, resource optimization (e.g., amount of memory used), model execution time, and so forth.

The application modeling engine 130 is also configured to deliver the data, via various visualizers 136, to the subscriber computing system 104. In some implementations, visualizers 136 include technology product analytics tools, such as product universe visualizers, product comparison visualizers, in-category product taxonomy visualizers, cross-category product taxonomy visualizers, and/or the like. These tools can enable stakeholders, including developers, technology strategists, and/or investors to determine the current state and access time series data for a particular technology product. For instance, the visualizers can generate and provide data streams 144 to applications 106 of the subscriber computing systems 104 (e.g., in response to requests 142, which can be application requests and/or API requests). The current state and/or time series data visualizers can also enable autonomous product relationship identification and product relationship strength measurement. In some implementations, visualizers 136 include momentum index visualizers, which can enable stakeholders to generate multidimensional interactive momentum maps for one or more products in a subscriber-defined comparison set. Generally, a momentum index can be thought of as multi-factor growth ranking for products within specific business functions. In some implementations, visualizers 136 include talent pool analytics tools, such as listing trackers/visualizers, hiring entity visualizers, and/or developer activity visualizers. In some implementations, the application modeling engine 130 includes configurable alerts, configurable subscription-based data feeds, and/or the like.

In an example implementation, the operations to generate, populate, modify, and/or receive signals and/or user input discussed herein are performed by a suitable engine (e.g., 108a, 108b, 110, 120, 130, 136, 140, 150) of the platform signal modeler 108 shown in FIG. 1A. However, one of skill will appreciate that operations can be performed, in whole or in part, using another suitable computing system. For instance, one or more source computing systems 102 can perform certain operations, such as responding to data update queries initiated by the subscriber computing system 104 via the platform signal modeler 108 or directly by the platform signal modeler 108. As another example, application 106 can cause the subscriber computing system 104 to perform certain operations, such as generating GUIs, displaying GUIs, configuring GUIs, querying a remote system for signals or data, receiving signals or data, populating GUIs, subscribing to signal or data streams, and/or the like.

Methods of Operation of the Platform Signal Modeler

FIGS. 1C-1F illustrate aspects of various methods of operation of the platform signal modeler 108, according to some implementations. In an example implementation, the operations can be performed by engines (108a, 108b, 110, 120, 130, 136, 140, 150) of the platform signal modeler 108 shown in FIG. 1B. However, one of skill will appreciate that the described operations can be performed, in whole or in part, on another suitable computing device, such as the source computing system 102 and/or the subscriber computing system 104 of FIG. 1B. As a general overview, the operations described herein enable a subscriber entity to generate and access technology-product related insights from sources of unstructured data.

Figure 1C:
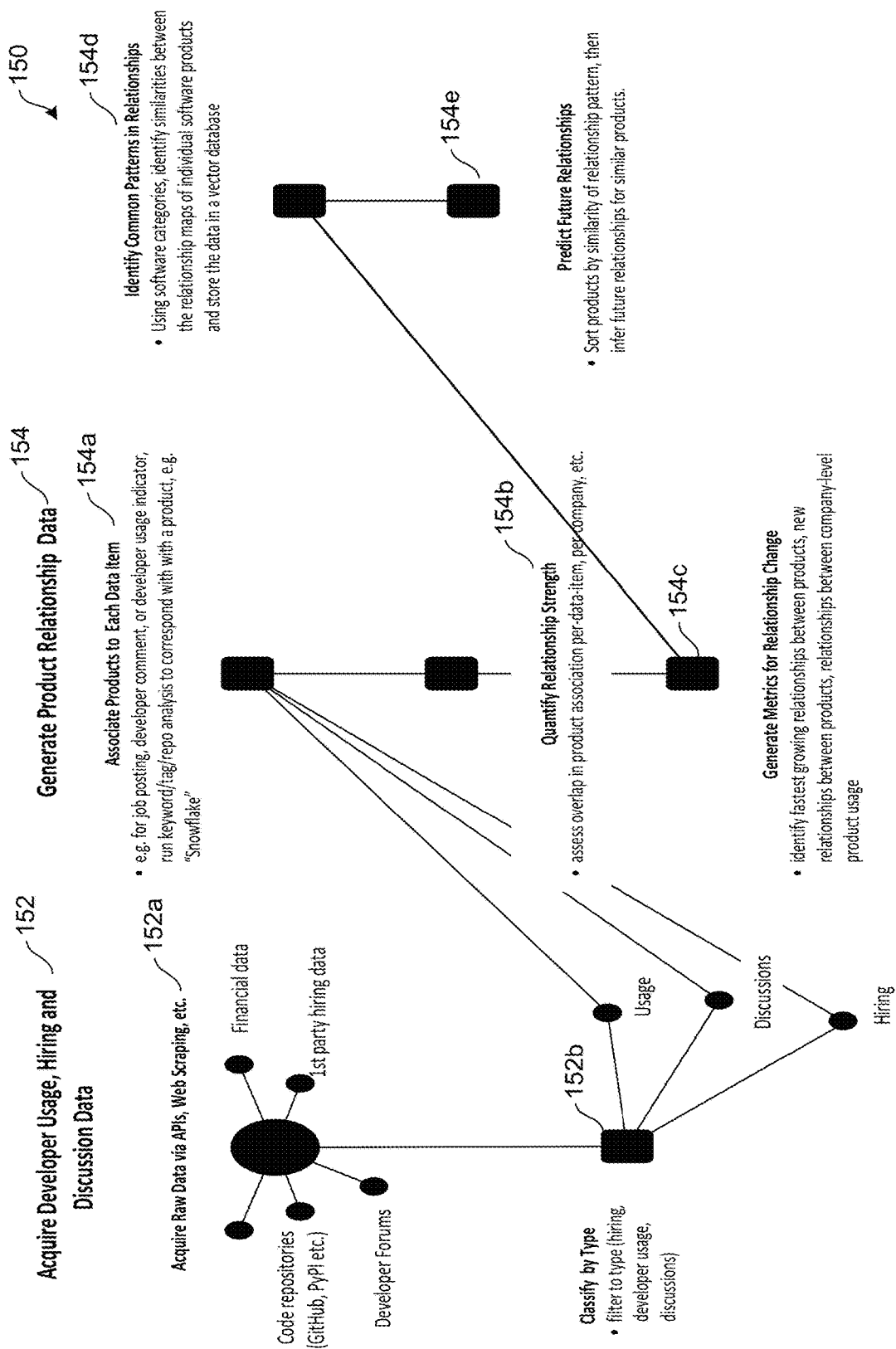
FIG. 1C is a flow diagram showing an example method to measure and predict trends in technology product relationships using the platform signal modeler, according to some implementations.

FIG. 1C is a flow diagram showing an example method 151 to measure and predict trends in technology product relationships using the platform signal modeler 108, according to some implementations. At 152, the platform signal modeler 108 can acquire, for example, via the extraction engine 110, input platform signals, which can include a variety of items, including unstructured data, such as that of example FIG. 1E. The input data can include, for example, financial data, code samples, annotations or other items from code repositories, developer forum posts, hiring data, and so forth. The data can be acquired 152a using an API, a web scraper, or another mechanism. The data can be classified 152b. For example, using semantic analysis (e.g., by extracting keywords), tags, data source attributes, data source URL strings or substrings, identifiers assigned to particular instances of the extraction engine 110, and so forth, the input data signals or segments thereof can be classified as usage signals, discussion signals, or hiring signals. In some implementations, classification can be performed using natural language processing (e.g., by extracting keywords/tokens). In some implementations, classification can be performed by quantizing, vectorizing, and comparing similarities of vectors that include items from the input signals.

At 154, the platform signal modeler 108 can generate product relationship data, for example, by associating 154a tokens extracted from the signals to product entries in a product indexer. In some implementations, the platform signal modeler 108 can use natural language processing and/or keyword search to extract the tokens and then augment the extracted tokens by mapping them to product entries in the indexer 140. The platform signal modeler 108 can further quantify 154b product relationship strength (e.g., by identifying a first set of product relationships for a first entity, a second set of product relationships for a second entity, and determining the degree (e.g., expressed as a percentage) of overlap between the sets, as described further in relation to example FIG. 4A.

At 154c, the platform signal modeler 108 can apply regression-based or other suitable models to identify changes (e.g., over time) in relationship strength in pairs of products. For example, the modeler can identify fastest growing relationships, new relationships (e.g., by determining that previously unrelated products are now mentioned within a predetermined semantic distance of one another), and so forth.

The platform signal modeler 108 can identify, at 154d, similarities between relationship maps (taxonomies) generated at 154b. For example, the taxonomy items (e.g., pair identifier, strength measure, time period) can be vectorized for comparison. Future relationships 154e can be predicted, for example, using the vectorized taxonomies. For example, if a particular first vectorized taxonomy item is within a certain threshold (e.g., 0.7, 0.8, or greater) of similarity to another, second vectorized taxonomy item, the relationship progression history for the first vectorized taxonomy item can be used (e.g., in a regression model, in a neural network) as an input feature to generate 154e a prediction of how the second vectorized taxonomy item will evolve. The platform signal modeler 108 can utilize the generated predictions to further generate predictions regarding developer skill set evolution. For example, the platform signal modeler 108 can use the frequency product mentions and/or tags in posts by a particular developer to calculate the composition of a particular developer's skill "stack" (e.g., Product A: 80% of time spent, Product B: 20% of time spent). Based on generating a prediction of how a particular vectorized taxonomy item will evolve (e.g., a 0.8 probability, using a regression-based model, that Product A's co-occurrence with Product B will decrease by M percent, and Product A's co-occurrence with Product C will increase by N percent), the values M, N can applied as adjustment factors to generate a prediction for an updated developer's skill set projection (e.g., Product A: 80%, Product b: 5%, Product C: 15%). The same can be applied to company tech stack predictions, wherein e.g. vectorized data regarding sequence of product adoption can be generalized to other firms exhibiting similar patterns and operating in similar industries.

Figure 1D:
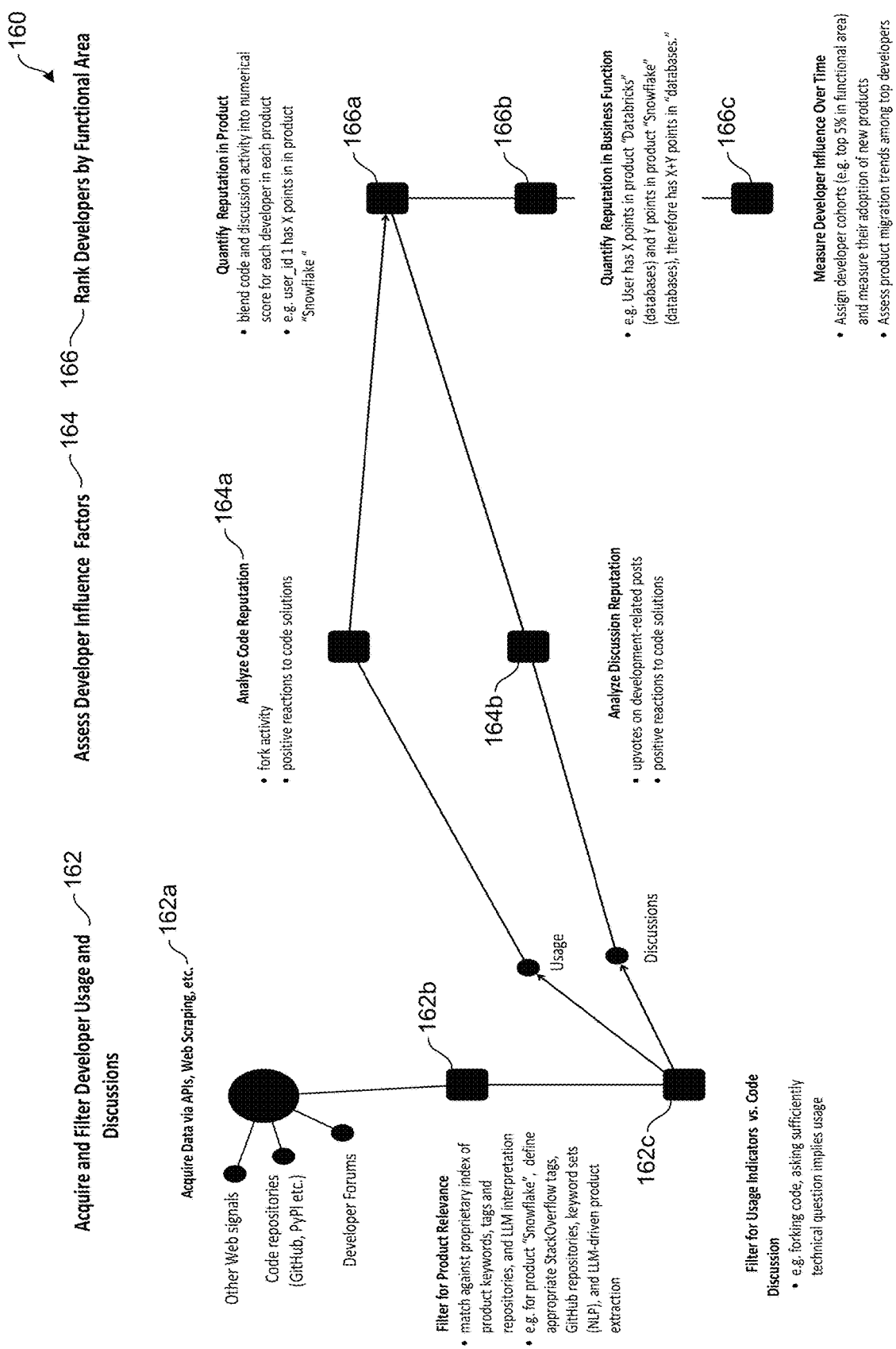
FIG. 1D is a flow diagram showing an example method to generate developer-related signals using the platform signal modeler, according to some implementations.

FIG. 1D is a flow diagram showing an example method 160 to generate developer-related signals using the platform signal modeler 108, according to some implementations. For example, after acquiring 162a data signals, the platform signal modeler 108 can filter 162b the tokens for product relevance, filter 162c the tokens for indicators of usage, hiring, or discussion, analyze 164a code reputation, analyze 164b developer reputation and rank 166 the developers. The developer rank can be used to identify top N or top N % developers and assess product migration trends among developers. To assess product migration trends, various metrics can be used. For example, counts of product mentions and/or product-specific code implementations by a developer can be compared over time. As another example, taxonomies can be generated at the developer level (e.g., to track product combinations used by a particular developer). The taxonomies can include product relationship strength indicators, which can change over time. As another example, a set of features (e.g., developer, product, use, company, vulnerabilities) can be provided to a trained neural network to generate indicators of trends in product migration by developer.

Figure 1E:
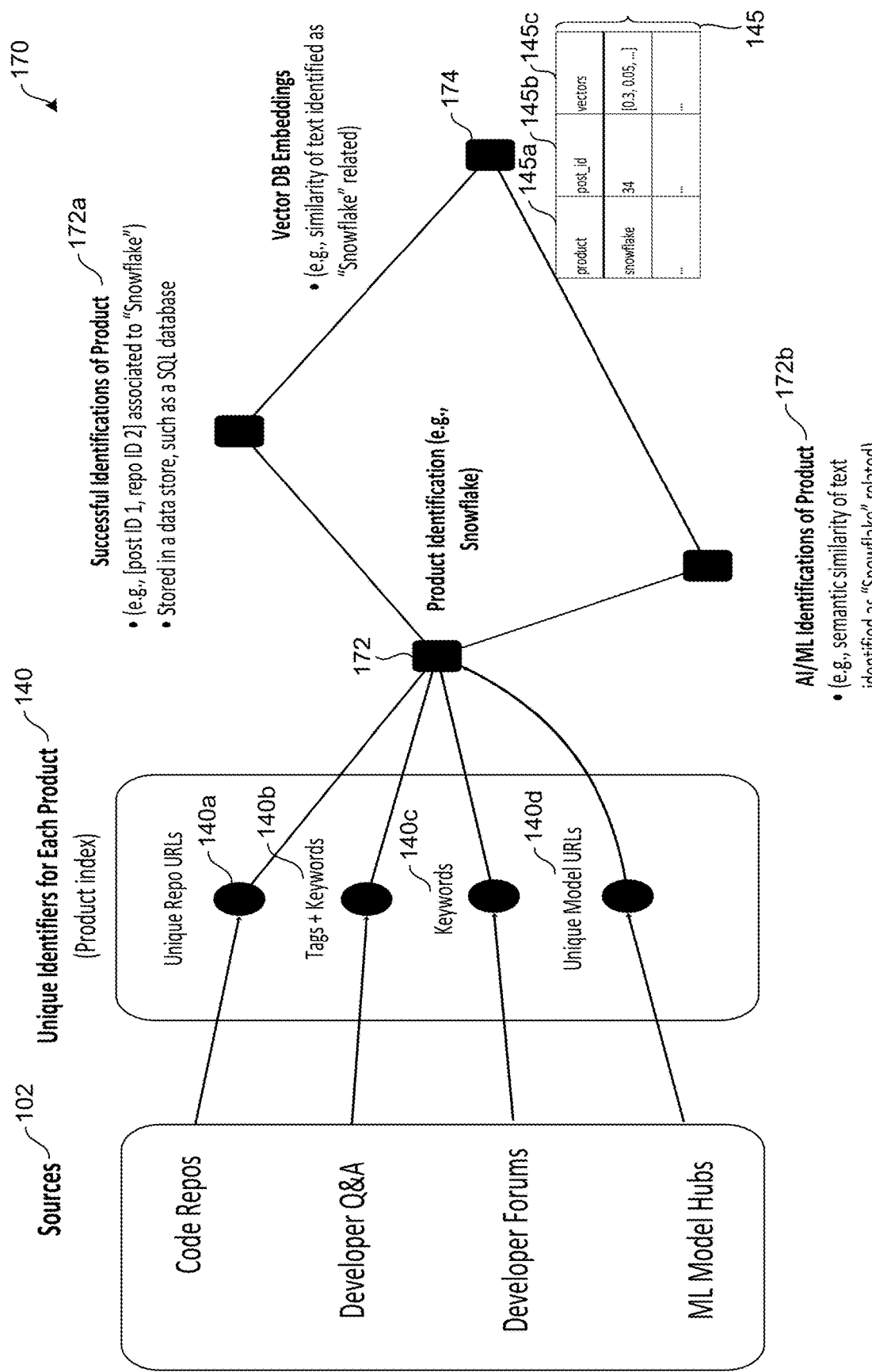
FIG. 1E is a flow diagram showing an example method to generate synthetic product-related signals, features and/or vectors using the platform signal modeler, according to some implementations.

FIG. 1E is a flow diagram showing an example method 170 to generate synthetic product-related signals, features and/or vectors using the platform signal modeler 108, according to some implementations—for example, to implement operations 154a and/or 162b. For example, after acquiring data signals from source computing systems 102, the platform signal modeler 108 can filter, parse or generate the product tokens and perform indexing 140. The tokens can include various items extracted or generated based on the data signal, such as any of the items 192, 194, 196, 198a, 198b, or 198c shown in FIG. 1G. In some implementations, the length of the tokens can correspond to the tunable context window (e.g., 1,000 characters, 10,000 characters), and the tokens can be further parsed to extract more granular terms. In some implementations, the tokens include or are based on metadata, such as tags and/or timestamps associated with the signal. In some implementations, the tokens are extracted using natural language processing and/or semantic search techniques.

Indexing 140 can include, for example, cross-referencing the tokens, in whole or in part, against various indexed attributes, such as source URLs 140a, tags 140b, keywords 140c, model URLs 140d, or combinations thereof.

A set of extracted tokens can include previously indexed items, such that the platform signal modeler 108 can successfully identify 172a the corresponding products. A set of extracted tokens can include new items (e.g., items previously unknown to the indexer 140). In such cases, the platform signal modeler 108 can perform 172b computer-based operations to automatically discover (e.g., identify and classify) the products that correspond to the tokens, as described, for example, further in relation to FIG. 2A. The platform signal modeler 108 can perform various operations to enhance and/or further contextualize the extracted token or set of tokens. For example, the platform signal modeler 108 can locate and bind additional metadata items to the tokens (e.g. in the form of properties, attributes, tags, key-value pairs), generate synthetic data items based on the tokens (e.g., by generating relational maps or bindings of the tokens and their metadata), vectorize the synthetic data items (e.g., by using a trained autoencoder or another neural network to generate embeddings based on the synthetic data items), identify similar vectorized items (e.g., using a similarity measure), and make a prediction regarding the product's category and other attributes based on a comparison of the similarity measure to a threshold. The vectorized item can be stored in the vector database 145 and can include, for example, product 145*a*, post identifier 145*b*, and/or embedding vector 145*c*. The vectorized item can be used to retrieve product information by linking the product 145*a* to an item stored in a data store of the indexer 140.

Additionally or alternatively, if a product is not successfully identified at 172*a*, the platform signal modeler 108 can perform automatic operations to conditionally generate a feature map for the neural network/autoencoder or another AI/ML model by selecting certain specific metadata or attributes for inclusion in the synthetic item (i.e. to generate targeted features). The conditional generation can be based on subscriber-specific tunable parameters (e.g., context window length, quantity of tokens to consider, size of token and metadata units to consider, and so forth). The conditional generation can, for example, select top N features to satisfy a tunable parameter value N. The top N features can be determined, for example, based on the output produced by another autoencoder model and/or based on the regularization metrics associated with the another autoencoder model. For example, assuming that an extracted token includes a product identifier, metadata items can include any of the data items described in this disclosure (e.g., any data items the extraction engine 110 can acquire from a variety of source systems), such as annotations or other items from code repositories, developer forum posts, product tags, product category tags, hiring data, and so forth. By ranking the top N features (e.g., hiring data with a context window of 30 days or another short context window, product mentions by influential developer, and so forth), the platform signal modeler 108 can reliably reduce the number of features needed to discover (identify) the product and its category. Reliability can be measured using, for example, an accuracy metric for the autoencoder, which can also be set to have a tunable threshold (e.g., 0.8, 0.9).

Figure 1F:
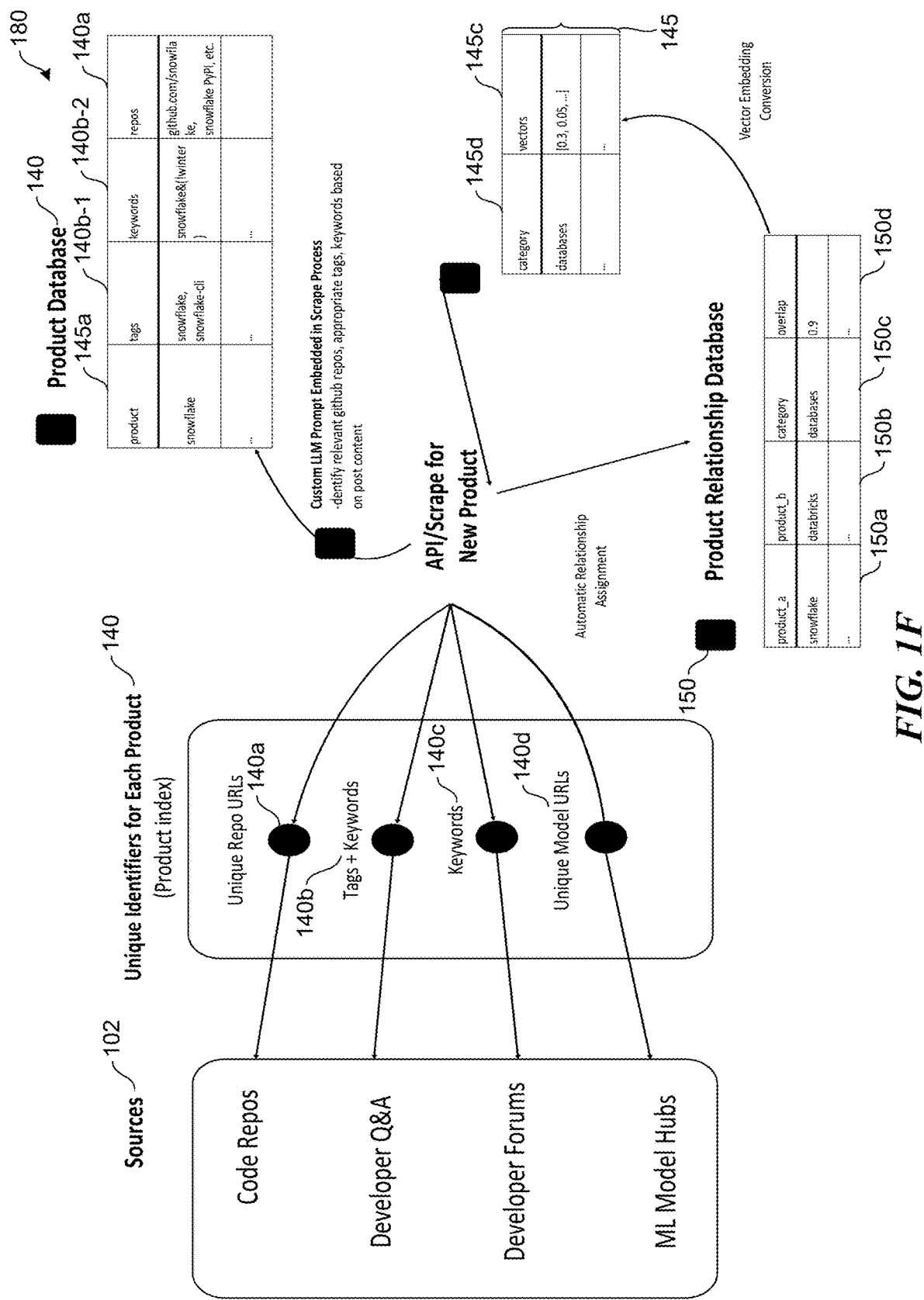
FIG. 1F is a flow diagram showing an example method for AI/ML based product discovery using the platform signal modeler, according to some implementations.
Figure 1G:
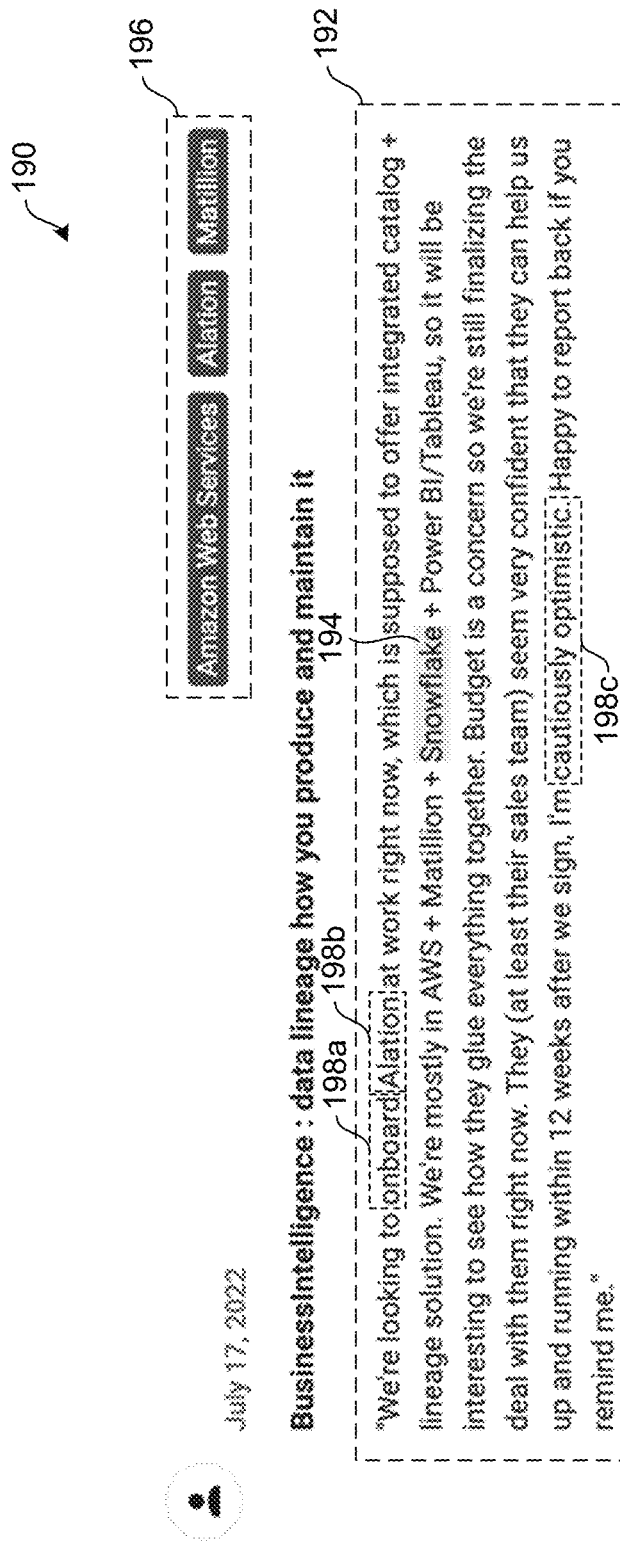
FIG. 1G includes aspects of an example platform signal, according to some implementations.

FIG. 1F is a flow diagram showing an example method 180 for AI/ML based product discovery using the platform signal modeler 108, according to some implementations. One or skill will appreciate that operations of the method 180 can be performed in conjunction with or can supplement the operations discussed in relation to operations 172*b* of FIG. 1E. In operation, for example, the extraction engine 110 of the platform signal modeler can perform a scheduled or ad-hoc scraping process to source new signals (e.g., new posts) from various source computing systems 102. The extraction engine 110 can extract from the signals various tokens 140*a*-140*d* (e.g., by using a previously created prompt stored by the indexer 140) and compare tokens to the respective items in a data store of the indexer 140. The data store of the indexer 140 can store previously entered or discovered product records. If a match is not found, the platform signal modeler can optionally augment the token by generating a synthetic item as described above, generate embeddings based on the token/augmented token, and vectorize 145 the signal. The vectorized portion 145*c* of the signal can be stored in association with a metadata item (e.g., category 145*d*, which can be determined based on items 140*a*-*d*, such as tags 140*b*). The category 145*d* can be used to cross-reference to a data store of the taxonomy generator 150, such as a product relationship database. The vectorized item can be compared to previously stored vectorized items to generate a similarity measure 150*d*.

Figure 2A:
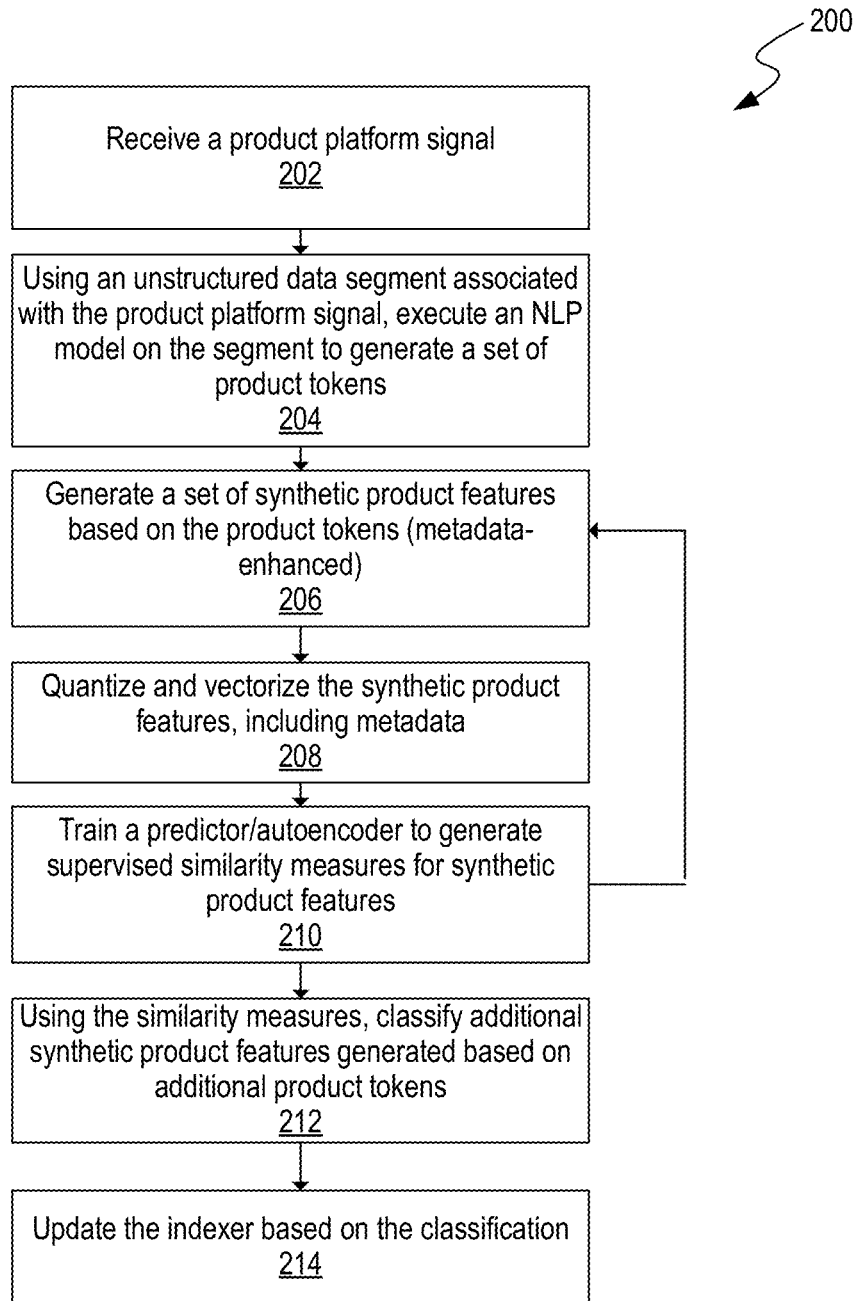
FIG. 2A is a flow diagram showing further aspects of an example method for AI/ML based product discovery using the platform signal modeler, according to some implementations.

FIG. 2A is a flow diagram showing further aspects of an example method 200 for AI/ML based product discovery using the platform signal modeler 108, according to some implementations. The method 200 can include receiving, at 202, a product platform signal. The platform signal can be parsed, at 204, to extract various tokens, such as tokens described in relation to FIG. 1E. The tokens can be used to generate synthetic signals at 206. For example, product tokens (e.g., product mentions from developer forum posts) can be bound to metadata that enhances semantic value of the product tokens, such as developer information, company information, vulnerability information, product tags, category tags, and so forth. At 208, the synthetic items can be vectorized and, at 210, an autoencoder, predictor or another suitable model can be executed on the vectorized dataset to generate similarity measures based on the vectorized information. A feedback loop to operations 206 can include processing additional signal data to improve model accuracy. At 212, additional synthetic product features (e.g., for additional signals from operations 202) can be fed to the autoencoder, predictor or another clustering model to classify the product mentions and/or tags in additional signals. At 214, the newly discovered (identified and classified) items can be added or updated in the indexer 140.

Figure 2B:
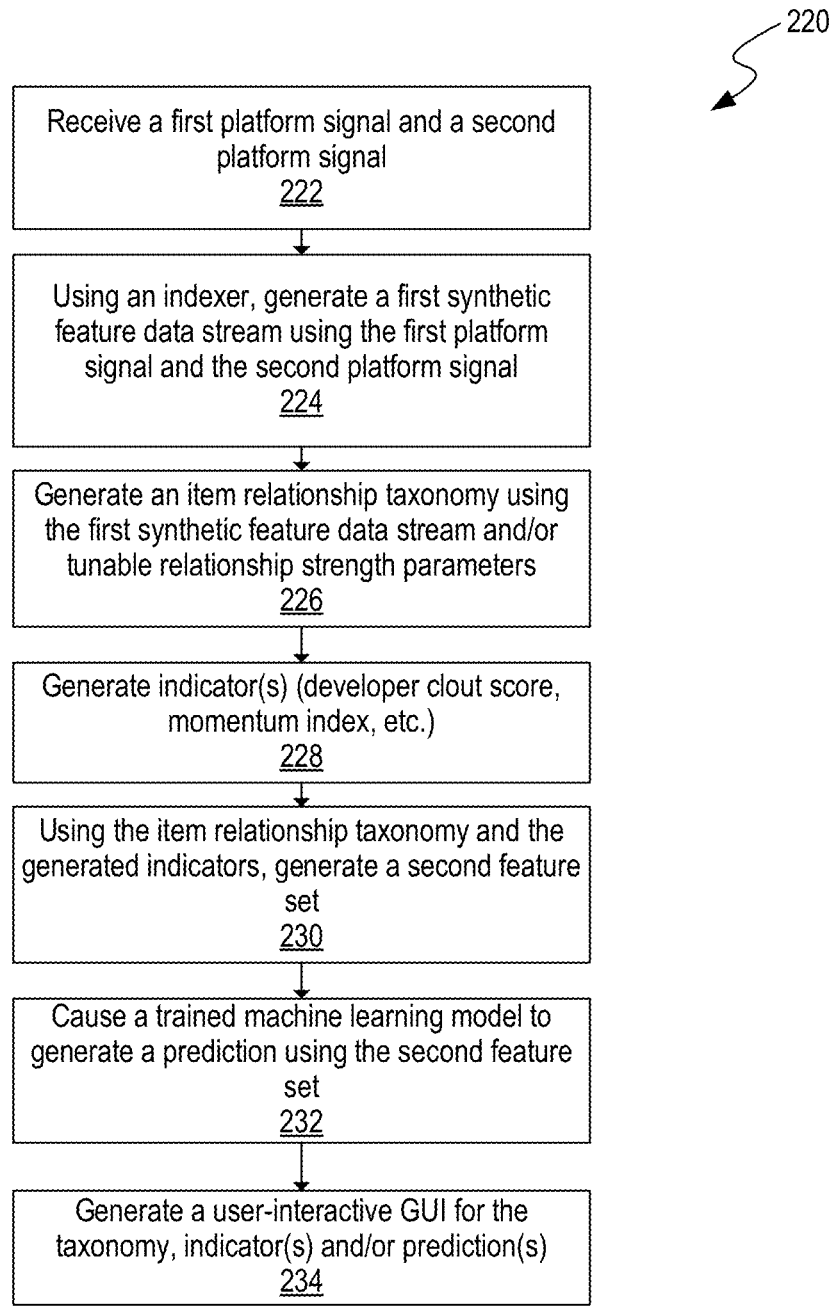
FIG. 2B is a flow diagram showing further aspects of operations of the developer activity modeler and product activity modeler, according to some implementations.

FIG. 2B is a flow diagram showing further aspects, in the method 220, of operations of the developer activity modeler 108*a* and product activity modeler 108*b*, according to some implementations. For example, the method 220 can include computer-based operations to generate predictions regarding product interrelationships, technology stack evolution, and so forth. The method 220 can include receiving, at 222, platform signals from one or more computing systems. For example, a first platform signal can be received from a developer discussion forum and a second platform signal can be received from a job board. At 224, the modelers (108*a*, 108*b*) can generate a synthetic feature data stream that can combine the signals. For example, product tokens extracted from discussion board posts can be cross-referenced to product tokens extracted from job postings. The items can be consolidated into a single synthetic item and further updated with metadata. In some implementations, the synthetic item can include metadata that includes product identifiers from co-occurring product mentions (e.g., where the two products are discussed together in a post, within a predetermined sematic distance of one another, by the same developer, and/or by the same company). In some implementations, rather than or in addition to binding information regarding co-occurring products as metadata for a product-related synthetic items, the modeler can relationally link two synthetic items that mention co-occurring products. At 226, a relationship taxonomy can be generated and can include a relationship strength measure. The relationship strength measure can be based on properties of the synthetic item(s), such as, for example, frequency of co-mentions. The relationship strength measure can be tunable, multi-dimensional and/or weighted. At 230, the item relationship taxonomy can be used to generate input features for a neural network or another suitable model. For example, the input features can include top N features determined (e.g., by an autoencoder) to be predictive in generating, at 232, inferences about how a product taxonomy or relationship will evolve. The input features can include, for example, item progression histories acquired from additional signals for products in similar categories, by analyzing acceleration in hiring data and developer usage for a product or its related products, by analyzing acceleration and/or severity in reports of topics including security vulnerabilities, and so forth. At 234, a user-interactive GUI can be generated to visualize the taxonomy, related indicators, or prediction(s) (i.e. to visualize the synthetic items, feature maps, and/or model outputs).

Thresholds can be established to alert subscribers to novel relationships and/or those reaching specific strength levels.

In various implementations, dimensions or inputs into various computations (e.g., momentum index, developer clout score, top companies, semantic distances between product tokens) can be determined using weights. In some implementations, the weight factors can be tunable. In some implementations, the weight factors are composite, such that comparatively more recent data in a time-weighted comparison (e.g., occurrences within the past 30 days) within a particular context window, also tunable, is weighted comparatively more heavily than older data (e.g., within the past 31-60 days, 61-90 days, etc.).

Example Embodiments of the AI/ML Engines of the Platform Signal Modeler

Figure 3:
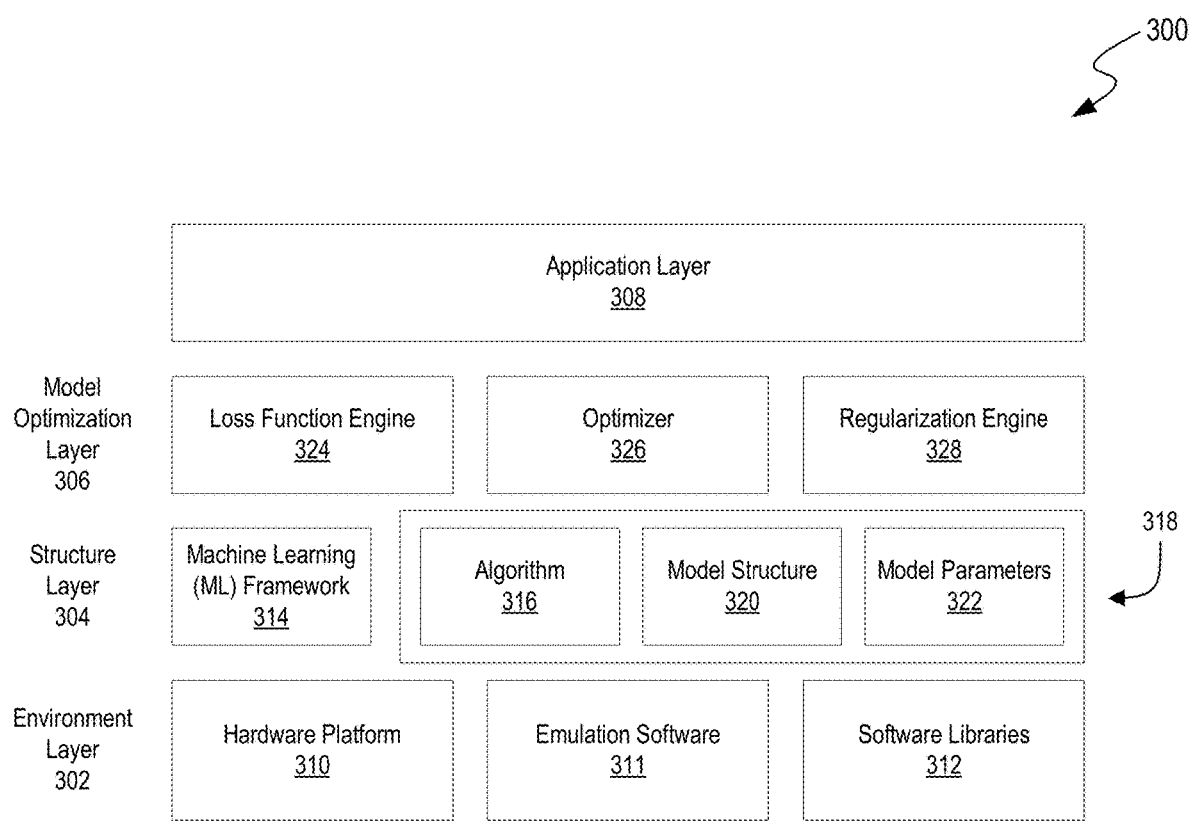
FIG. 3 is a block diagram showing an AI/ML stack of the platform signal modeler, according to some implementations.

FIG. 3 illustrates a layered architecture of an artificial intelligence (AI) system 300 that can implement the machine learning models of the platform signal modeler 108, in accordance with some implementations of the present technology. For example, various engines of the platform signal modeler 108 (e.g., engines 108a, 108b, 110, 120, 130, 136, 140, 150) can include some or all elements described in relation to FIG. 3.

As shown according to FIG. 3, the AI system 300 can include a set of layers, which conceptually organize elements within an example network topology for the AI system's architecture to implement a particular AI model. Generally, an AI model is a computer-executable program implemented by the AI system 300 that analyzes data to make predictions. In some implementations, the AI model can include various other models, such as neural networks trained to identify entities (e.g., products, developers) in pre-processed input data, classify entities (e.g., products, developers) in pre-processed input data, identify recurrence, trends and other patterns in pre-processed input data (e.g. relationship data), generate indexes, generate indicators (e.g., developer cloud scores, momentum indexes, other calculations), and so forth.

In the AI model, information can pass through each layer of the AI system 300 to generate outputs for the AI model. The layers can include an environment layer 302, a structure layer 304, a model optimization layer 306, and an application layer 308. The algorithm 316, the model structure 320, and the model parameters 322 of the structure layer 304 together form an example AI model 318. The loss function engine 324, optimizer 326, and regularization engine 328 of the model optimization layer 306 work to refine and optimize the AI model, and the environment layer 302 provides resources and support for application of the AI model by the application layer 308.

The environment layer 302 acts as the foundation of the AI system 300 by preparing data for the AI model. As shown, the environment layer 302 can include three sub-layers: a hardware platform 310, an emulation software 311, and one or more software libraries 312. The hardware platform 310 can be designed to perform operations for the AI model and can include computing resources for storage, memory, logic and networking, such as the resources described in relation to FIGS. 8 and 9. The hardware platform 310 can process amounts of data using one or more servers. The servers can perform backend operations such as matrix calculations, parallel calculations, machine learning (ML) training, and the like. Examples of servers used by the hardware platform 310 include central processing units (CPUs), graphics processing units (GPUs), neural processing units (NPUs), and systems-on-chip (SoC). CPUs are electronic circuitry designed to execute instructions for computer programs, such as arithmetic, logic, control, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. NPUs are specialized circuits that implement the necessary control and arithmetic logic to execute machine learning algorithms. NPUs can also be referred to as tensor processing units (TPUs), neural network processors (NNPs), intelligence processing units (IPUs), and/or vision processing units (VPUs). SoCs are IC chips that comprise most or all components found in a functional computer, including an on-chip CPU, volatile and permanent memory interfaces, I/O operations, and a dedicated GPU, within a single microchip. In some instances, the hardware platform 310 can include Infrastructure as a Service (IaaS) resources, which are computing resources (e.g., servers, memory, etc.) offered by a cloud services provider. The hardware platform 310 can also include computer memory for storing data about the AI model, application of the AI model, and training data for the AI model. The computer memory can be a form of random-access memory (RAM), such as dynamic RAM, static RAM, and non-volatile RAM.

The emulation software 311 provides tools for building virtual environments on the hardware platform 310 to simulate operating systems (e.g., Windows, Linux, MacOS, etc.), and their respective protocols, that are not native to the computing system of the hardware platform 310. Thus, emulating operating systems on the hardware platform 310 allows cross-compatible application and deployment of the AI model 318 across multiple devices and computing systems. Examples of emulation software 311 include Docker and VirtualBox.

The software libraries 312 can be thought of as suites of data, programming code, including executables, used to control and optimize the computing resources of the hardware platform 310. The programming code can include low-level primitives (e.g., fundamental language elements) that form the foundation of one or more low-level programming languages, such that servers of the hardware platform 310 can use the low-level primitives to carry out specific operations. The low-level programming languages do not require much, if any, abstraction from a computing resource's instruction set architecture, allowing them to run quickly with a small memory footprint. Examples of software libraries 312 that can be included in the AI system 300 include software libraries Intel Math Kernel Library, Nvidia cuDNN, Eigen, and Open BLAS. The software libraries 312 also feature distribution software, or package managers, that manage dependency software. Distribution software enable version control of individual dependencies and simplified organization of multiple collections of programming code. Examples of distribution software include PyPI and Anaconda.

The structure layer 304 can include an ML framework 314 and an algorithm 316. The ML framework 314 can be thought of as an interface, library, or tool that allows users to build and deploy the AI model. The ML framework 314 can include an open-source library, an application programming interface (API), a gradient-boosting library, an ensemble method, and/or a deep learning toolkit that work with the layers of the AI system to facilitate development of the AI model. For example, the ML framework 314 can distribute processes for application or training of the AI model across multiple resources in the hardware platform 310. The ML framework 314 can also include a set of pre-built components that have the functionality to implement and train the AI model and allow users to use pre-built functions and classes to construct and train the AI model. Thus, the ML framework 314 can be used to facilitate data engineering, development, hyperparameter tuning, testing, and training for the AI model. Examples of ML frameworks 314 that can be used in the AI system 300 include TensorFlow, PyTorch, Scikit-Learn, Scikit-Fuzzy, Keras, Caffe, LightGBM, Random Forest, Fuzzy Logic Toolbox, and Amazon Web Services (AWS).

The ML framework 314 serves as an interface for users to access pre-built AI model components, functions, and tools to build and deploy custom designed AI systems via programming code. For example, user-written programs can execute instructions to incorporate available pre-built structures of common neural network node layers available in the ML framework 314 into the design and deployment of a custom AI model. In other implementations, the ML framework 314 is hosted on cloud computing platforms offering modular machine learning services that users can modify, execute, and combine with other web services. Examples of cloud machine learning interfaces include AWS SageMaker and Google Compute Engine. In other implementations, the ML framework 314 also serves as a library of pre-built model algorithms 316, structures 320, and trained parameters 322 with predefined input and output variables that allow users to combine and build on top of existing AI models. Examples of ML frameworks 314 with pretrained models include Ultralytics and MMLab.

The algorithm 316 can be an organized set of computer-executable operations used to generate output data from a set of input data and can be described using pseudocode. The algorithm 316 can include program code that allows the computing resources to learn from new input data and create new/modified outputs based on what was learned. In some implementations, the algorithm 316 can build the AI model through being trained while running computing resources of the hardware platform 310. This training allows the algorithm 316 to make predictions or decisions without being explicitly programmed to do so. Once trained, the algorithm 316 can run at the computing resources as part of the AI model to make predictions or decisions, improve computing resource performance, or perform tasks. The algorithm 316 can be trained using supervised learning, unsupervised learning, semi-supervised learning, self-supervised learning, reinforcement learning, and/or federated learning.

Using supervised learning, the algorithm 316 can be trained to learn patterns (e.g., match input data to output data) based on labeled training data, such as product data, developer data, relationship/taxonomy data, product stack compositions, product co-occurrence data, technology stack evolution data, and so forth.

Supervised learning can involve classification and/or regression. Classification techniques involve teaching the algorithm 316 to identify a category of new observations based on training data and are used when the input data for the algorithm 316 is discrete. Said differently, when learning through classification techniques, the algorithm 316 receives training data labeled with categories (e.g., classes) and determines how features observed in the training data (e.g., vectorized product information) relate to the categories, such as product categories. Once trained, the algorithm 316 can categorize new data (for example, new product data) by analyzing the new data for features that map to the categories. Examples of classification techniques include boosting, decision tree learning, genetic programming, learning vector quantization, k-nearest neighbor (k-NN) algorithm, and statistical classification.

Federated learning (e.g., collaborative learning) can involve splitting the model training into one or more independent model training sessions, each model training session assigned an independent subset training dataset of the training dataset (e.g., data from a data store of the indexer 140, vector database 145, and/or taxonomy generator 150). The one or more independent model training sessions can each be configured to train a previous instance of the model 318 using the assigned independent subset training dataset for that model training session. After each model training session completes training the model 318, the algorithm 316 can consolidate the output model, or trained model, of each individual training session into a single output model that updates model 318. In some implementations, federated learning enables individual model training sessions to operate in individual local environments without requiring exchange of data to other model training sessions or external entities. Accordingly, data visible within a first model training session is not inherently visible to other model training sessions.

Regression techniques involve estimating relationships between independent and dependent variables and are used when input data to the algorithm 316 is continuous. Regression techniques can be used to train the algorithm 316 to predict or forecast relationships between variables, such as developers and products, trends in product adoption, trends in product interrelationships, trends in product co-occurrence, and so forth. To train the algorithm 316 using regression techniques, a user can select a regression method for estimating the parameters of the model. The user collects and labels training data that is input to the algorithm 316 such that the algorithm 316 is trained to understand the relationship between data features and the dependent variable(s). Once trained, the algorithm 316 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations. In another example implementation, regression techniques can be used to generate predictions for trends in product co-occurrence or other similar items (e.g., to predict how a particular technology stack with evolve, how the developer skill set will correspondingly evolve, and so forth). In some implementations, regression models can be trained using vectorized product co-occurrence data. In instances where products cannot be identified by the indexer 140, the training data can be generated, for example, by vectorizing product data and comparing the vectorized data (e.g., by a neural network) to additional vectorized data (e.g., for products in the same category) to determine how the product relationships in the additional vectorized data have evolved.

Under unsupervised learning, the algorithm 316 learns patterns from unlabeled training data. In particular, the algorithm 316 is trained to learn hidden patterns and insights of input data, which can be used for data exploration or for generating new data. Here, the algorithm 316 does not have a predefined output, unlike the labels output when the algorithm 316 is trained using supervised learning. Said another way, unsupervised learning is used to train the algorithm 316 to find an underlying structure of a set of data, group the data according to similarities, and represent that set of data in a compressed format. The platform can use unsupervised learning to identify patterns in input data, such as synthetic product features. Whether learning is supervised or unsupervised, various similarity measures 150*d*, such as Euclidian distance, Pearson correlation coefficients, and/or cosine similarity, can be used. The similarity measures can be within a predetermined threshold, such as under 0.4, under 0.5, under 0.6, and so forth on the 0.0-1.0 scale.

The model optimization layer 306 implements the AI model using data from the environment layer 302 and the algorithm 316 and ML framework 314 from the structure layer 304, thus enabling decision-making capabilities of the AI system 300. The model optimization layer 306 can include a model structure 320, model parameters 322, a loss function engine 324, an optimizer 326, and/or a regularization engine 328.

The model structure 320 describes the architecture of the AI model of the AI system 300. The model structure 320 defines the complexity of the pattern/relationship that the AI model expresses. Examples of structures that can be used as the model structure 320 include decision trees, support vector machines, regression analyses, Bayesian networks, Gaussian processes, genetic algorithms, and artificial neural networks (or, simply, neural networks). The model structure 320 can include a number of structure layers, a number of nodes (or neurons) at each structure layer, and activation functions of each node. Each node's activation function defines how a node converts data received to data output. The structure layers may include an input layer of nodes that receive input data, an output layer of nodes that produce output data. The model structure 320 may include one or more hidden layers of nodes between the input and output layers. The model structure 320 can be an Artificial Neural Network (or, simply, neural network) that connects the nodes in the structured layers such that the nodes are interconnected. Examples of neural networks include feed-forward neural networks, convolutional neural networks (CNNs), recurrent neural networks (RNNs), autoencoder, and generative adversarial networks (GANs). According to various implementations, neural networks can be used, for example, by the developer activity modeler 108*a*, product ecosystem modeler 108*b*, extraction engine 110, foundational modeling engine 120, and/or application modeling engine 130 of FIG. 1B.

The model parameters 322 represent the relationships learned during training and can be used to make predictions and decisions based on input data. The model parameters 322 can weight and bias the nodes and connections of the model structure 320. For instance, when the model structure 320 is a neural network, the model parameters 322 can weight and bias the nodes in each layer of the neural networks, such that the weights determine the strength of the nodes and the biases determine the thresholds for the activation functions of each node. The model parameters 322, in conjunction with the activation functions of the nodes, determine how input data is transformed into desired outputs. The model parameters 322 can be determined and/or altered during training of the algorithm 316.

The model structure 320, parameters 322, and algorithm 316 formally comprise the design, properties, and implementation of an AI model 318. The structure 320 defines the types of input data used, types of output data produced, and parameters 322 available that can be modified by the algorithm 316. The model parameters 322 are assigned values by the algorithm 317 that determine the characteristics and properties of a specific model state. For example, the algorithm 316 can improve model task performance by adjusting the values of parameters 322 that reduces prediction errors. The algorithm 320 is responsible for processing input data to be compatible with the model structure 320, executing the AI model 318 on available training data, evaluating performance of model output, and adjusting the parameters 322 to reduce model errors. Thus, the model structure 320, parameters 322, and algorithm 316 comprise co-dependent functionalities and are the core components of an AI model 318.

The loss function engine 324 can determine a loss function, which is a metric used to evaluate the AI model's performance during training. For instance, the loss function engine 324 can measure the difference between a predicted output of the AI model and the actual output of the AI model and is used to guide optimization of the AI model during training to minimize the loss function. The loss function can be used to determine autoencoder performance in identifying and classifying new product mentions.

The optimizer 326 adjusts the model parameters 322 to minimize the loss function during training of the algorithm 316. In other words, the optimizer 326 uses the loss function generated by the loss function engine 324 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 326 used may be determined based on the type of model structure 320 and the size of data and the computing resources available in the environment layer 302.

The regularization engine 328 executes regularization operations. Regularization is a technique that prevents over- and under-fitting of the AI model. Overfitting occurs when the algorithm 316 is overly complex and too adapted to the training data, which can result in poor performance of the AI model. Underfitting occurs when the algorithm 316 is unable to recognize even basic patterns from the training data such that it cannot perform well on training data or on validation data. The optimizer 326 can apply one or more regularization techniques to fit the algorithm 316 to the training data properly, which helps constraint the resulting AI model and improves its ability for generalized application. Examples of regularization techniques include lasso (L1) regularization, ridge (L2) regularization, and elastic (L1 and L2) regularization.

The application layer 308 describes how the AI system 300 is used to solve problem or perform tasks. In an example implementation, the application layer 308 can include the visualizer 136 of the platform signal modeler 108 of FIG. 1B. For example, the visualizer 136 can generate data files and/or messages that include model outputs.

Use Cases for the Platform Signal Modeler

Use cases for technology disclosed herein can include sales prospect Identification and prioritization. For example, co-occurrence algorithms and/or taxonomy-based product relationship inferences can be used to automatically identify and prioritize potential sales prospects for software products by analyzing product adoption patterns that create tailwinds and headwinds for sales success.

Use cases can include identification of product development opportunities. For example, the technology disclosed herein can identify potential product development and product management opportunities/issues by automatically determining increases and decreases in co-occurrence trends in a particular relationship between two identified products.

Use cases can include company technology stack analytics. For example, the technology can provide an in-depth look at where individual companies are making investments in specific software products and broader software categories. The disclosed technology can automatically compare software product investments across peer groups to evaluate how many high-momentum or emerging product a company invests in relative to a company's peers. The technology can be used to automatically determine how early one company invests in a specific product relative to an industry average to provide perspective on whether a company is a leading-edge company with respect to particular software technology or a laggard.

Use cases can include stock selection and automated portfolio construction. For example, momentum index can be used to automatically identify, rank and prioritize software products and/or software companies projected to be favorable public equity investments over a multi-year horizon based on various automatically determined trends, such as developer usage, discussion activity, hiring activity, influential developer activity and/or influential hiring company activity.

Use cases can include private company investment prioritization. For example, the momentum index can be used to identify, rank and prioritize software products and private software companies that are positioned to be favorable private company investments over a multi-year horizon based on various automatically determined trends, such as developer usage, discussion activity, hiring activity, influential developer activity and/or influential hiring company activity.

Use cases can include market and competitive Intelligence. For example, the technology can provide broad insights on competitive software products based on developer activity and growth, hiring company activity and growth, product sentiment, industry traction (for example, financial companies versus healthcare) and ecosystem development. Various system-generated metrics, such as developer index, sentiment determination, taxonomy and/or job measures can be used.

In some implementations, the platform disclosed herein can provide automated alerts in a number of areas. Alerts can be generated and provided, for example, by the developer activity modeler 108*a* and/or product ecosystem modeler 108*b* of the platform signal modeler 108.

For example, sales alerts can include new prospect alerts, where the platform signal modeler 108 identifies when a technology company's prospect invests in a technology product that is a precursor to an investment in that technology company's product. Sales alerts can include upsell opportunity alerts, where the platform signal modeler 108 identifies when a technology company's customer invests in new foundational/precursor products that provide new sales opportunities for the company's products. Sales alerts can include competitive incursion alerts, where the platform signal modeler 108 identifies when a company's customer invests in a competitor product.

As another example, developer relations alerts can be provided. Using influential developer switching alerts, for instance, the platform signal modeler 108 can identify and alert subscribers when an influential developer for a specific software company's product(s) shows interest in or adopts a competing product. As another example, marketing and product development alerts can be provided. For instance, using co-occurrence alerts, the platform signal modeler 108 can identify and alert subscribers when a co-occurrence index between its product and another foundational or adjacent technology product changes by a designated threshold. Using new taxonomy relationship alerts, the platform signal modeler 108 can identify and alert subscribers when a new relationship is detected between a software company' product and another software product.

User-Interactive Features of the Platform Signal Modeler

Example features of the platform signal modeler can include both horizontal and vertical features. Horizontal features are applicable across use cases and include, for example, data extraction, data indexing, taxonomy generation, foundational modeling (computer-based analytics that allow the platform signal modeler to determine foundational measures of activity), application modeling (specific algorithms applied to generate visualizers or deliver custom signals to particular subscribers) and/or subscriber management. Vertical features can include, for example, product analytics and talent pool analytics. To that end, FIGS. 4A-7B show example GUIs that illustrate various user-interactive aspects of horizontal and/or vertical features of the platform signal modeler, according to some implementations.

Figures 1, 4A:
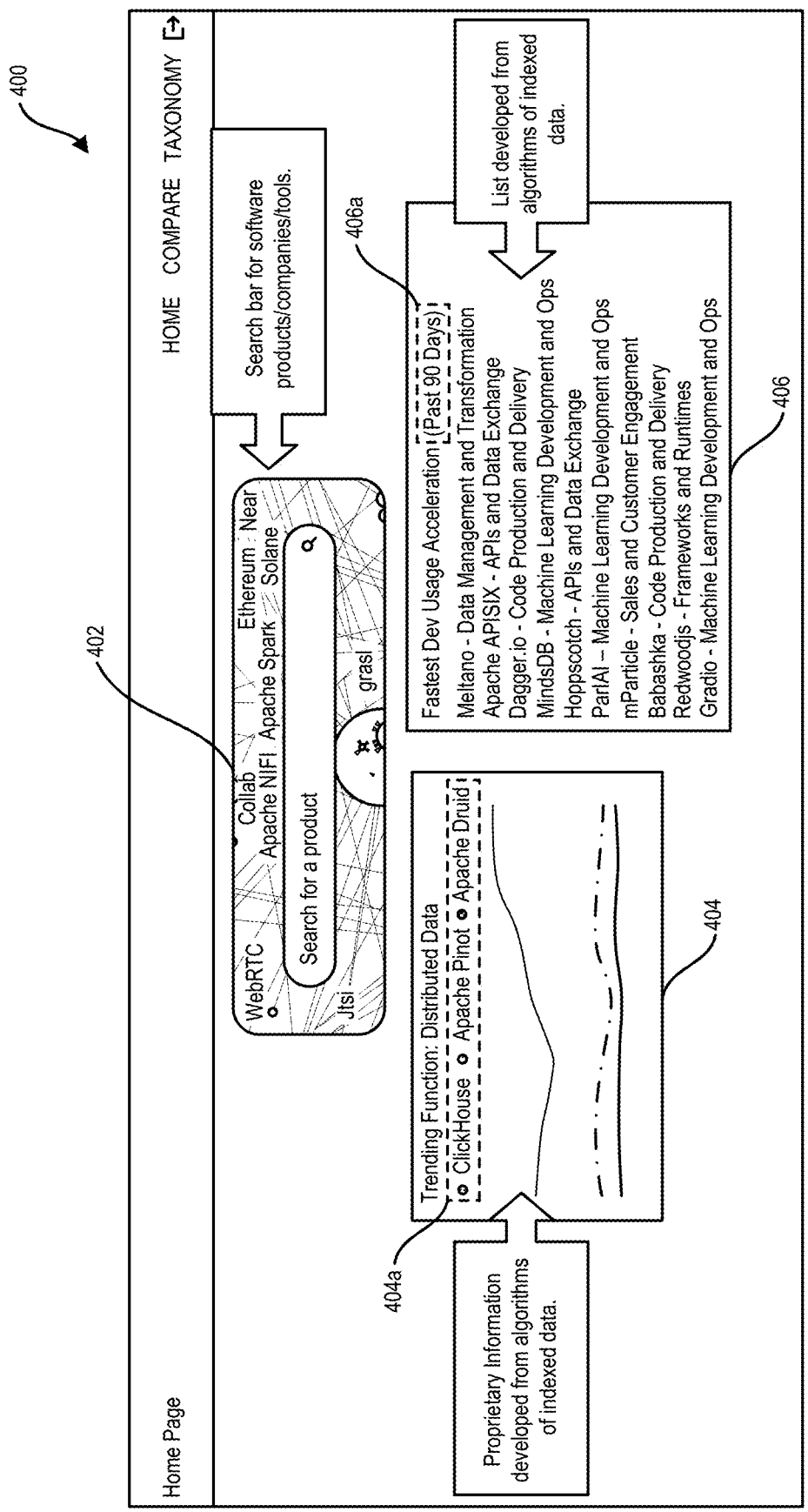
FIG. 4A-1 shows a graphical user interface (GUI) that includes a landing page of the example platform signal modeler, according to some implementations.

FIG. 4A-1 shows a landing page 400 of an example platform signal modeler, according to some implementations. The landing page 400 is generated and provided to a user, via a display of the subscriber computing system 104, after a user successfully authenticates. In some implementations, an authentication mechanism can include generating and displaying to a user a GUI that includes data controls to collect authentication information. In some implementations, authentication information can include biometric information collected using a camera connected to or built into the subscriber computing system 104. In some implementations, the authentication information can include any of a user name, social networking handle, active directory information, PIN code, password, token, and/or the like. The authentication information is verified against the information stored in a user profile, such as a data store accessible to the platform signal modeler 108 of FIG. 1B.

In some implementations, instead of or in addition to authenticating an individual, an identifier associated with the subscriber computing system 104 is authenticated. The identifier can be or include a MAC address, an International Mobile Equipment Identity (IMEI) number, an International Mobile Subscriber Identity (IMSI) number, an Integrated Circuit Card Identifier (ICCID), s Subscriber Identity Module (SIM) identifier, an eSIM identifier, a unique equipment identifier associated with a transceiver on the host device (e.g., antenna, Bluetooth module), an IP address, and/or the like. In some implementations, the authentication process is substantially undetectable to the user and occurs automatically in the background.

As shown, the landing page 400 includes a multi-purpose search bar 402 configured to allow a user to search for a product, company, developer, tool, and/or the like. In some implementations, the platform signal modeler 108 can store, in cached form, or cause the subscriber computing system 104 to store, a history of recent searches by the user, a consolidated history of searches by a group of users affiliated with a particular entity (e.g., a group of application 106 license holders at a particular organization), and/or the like.

In some implementations, the elements provided to the user via the landing page 400 are configured using one or more settings stored in the user profile. For example, the landing page 400 can include a product trending visualizer 404 for a particular product 404a or product 404a category that corresponds to a user preference in a user profile. As another example, the landing page 400 can include one or more pre-populated controls, such as the result set 406 that shows products with the highest developer usage acceleration rate for a particular time period 406a, which can be a tunable setting.

In some implementations, the elements provided to the user via the landing page 400 include expandable controls populated in response to a search query provided via a GUI component, such as the search bar 402. In some implementations, the platform signal modeler 108 can parse a character token from the entered search string and compare the character token to one or more data items retrievably stored by the indexer 140 in order to determine the type of query (e.g., product, company, developer, tool) submitted by the user. In some implementations, the platform signal modeler 108 can configure one or more display controls to perform any of: display search results, display a graph showing trends relevant to the search results (e.g., rank of a particular product 404a relative to other similar products, developer posts on the particular product 404a, developer information relating to the product 404a, hiring trends relating to the product 404a, etc.). For example, the one or more display controls 404 and/or 406 can remain hidden to preserve screen space when a user logs in.

Responsive to parsing the search query string entered by the user and determining the type of search requested, the display controls 404 and/or 406 are populated with relevant information. In some implementations, the number of results in the returned result set can be determined by first determining the size of the display of the subscriber computing system 104, then determining the maximum number of rows that can be accommodated by the display without adversely impacting readability and, subsequently, displaying the corresponding number or fewer records from the search result record set.

According to various implementations, records can be selected for inclusion in the result record set based on the value of a particular score, index, or category, such as the developer usage activity score, developer clout score, product momentum index, product interrelationships, and/or discussion sentiment. For example, an item in the indexer 140 can be stored relationally to any of the previously computed developer usage activity score, developer clout score, product momentum index, product interrelationships, and/or discussion sentiment. The previously computed scores can be in a standardized range, such as 1-100, and/or can serve as a ranking basis. The user can enter a natural language query that identifies the metric and the threshold or range (e.g., "Please show me top 5 products for developer ABC and co-occurring products.") The query can be parsed to determine the tokens indicative of the data to query (e.g., "top 5 products", "developer ABC", and "co-occurring products").

Figures 2, 4A:
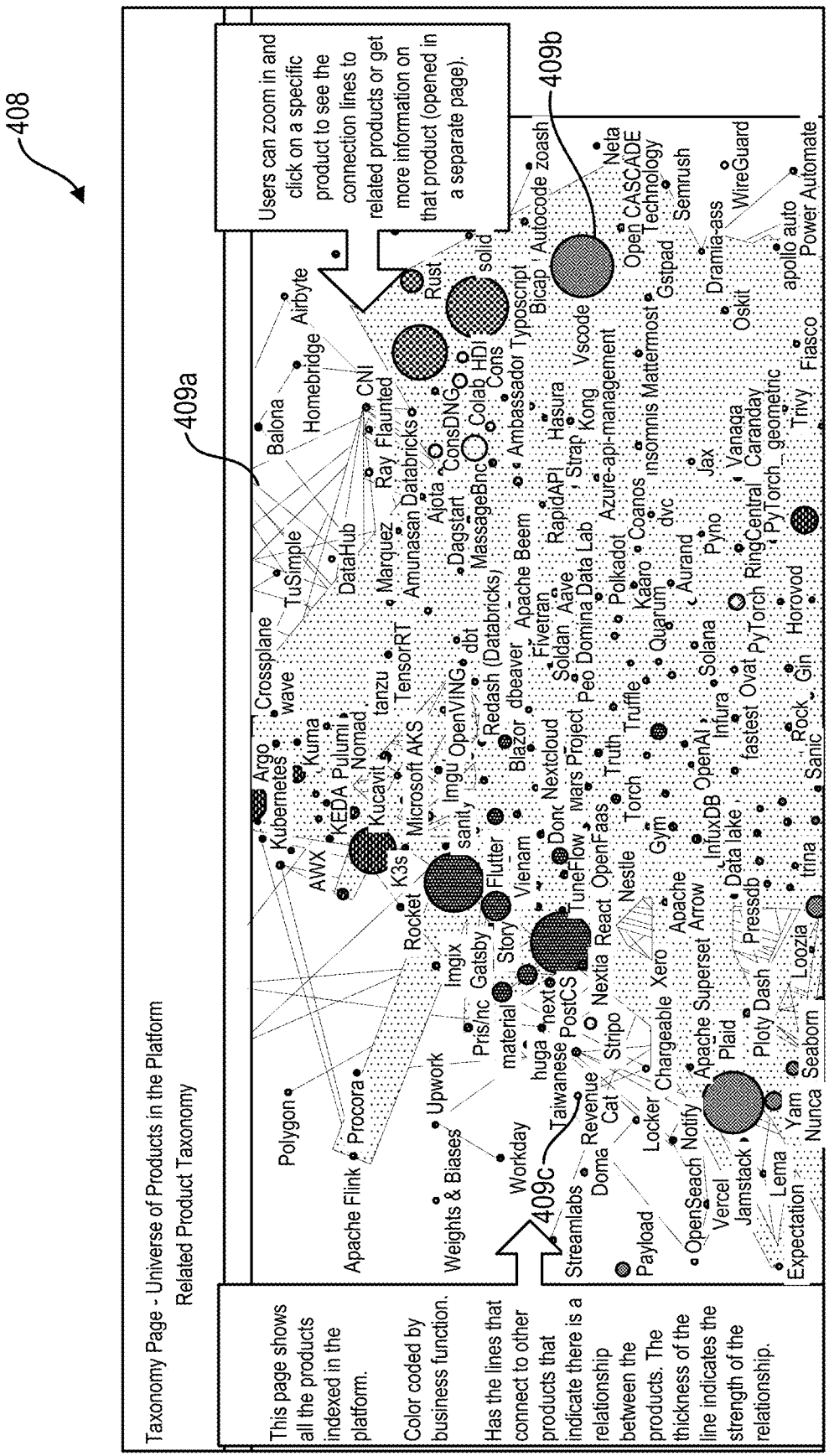
Figure 4B:
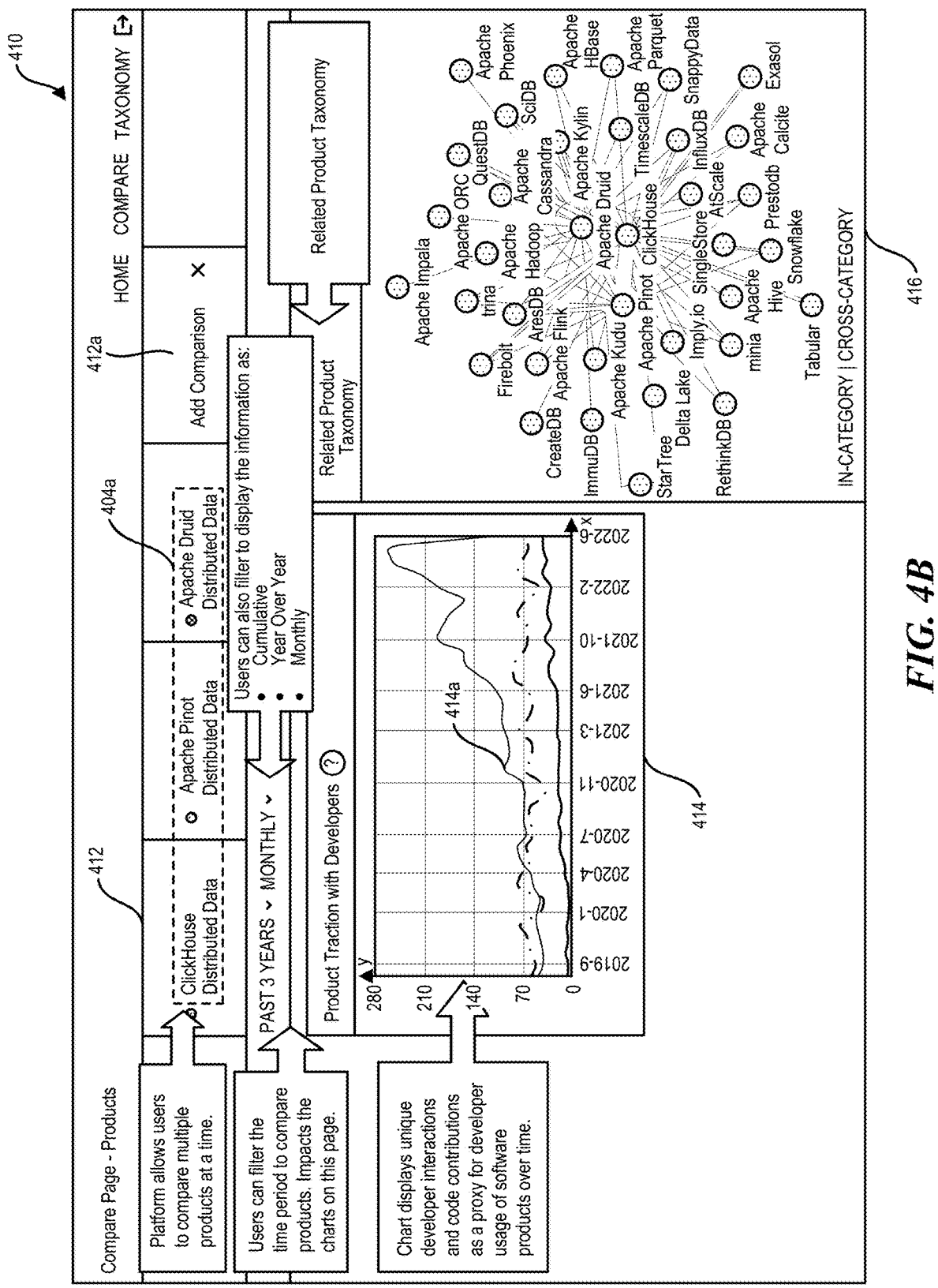
FIGS. 4B-4E show additional GUIs for technology product analytics in an example platform signal modeler, according to some implementations.
Figure 4C:
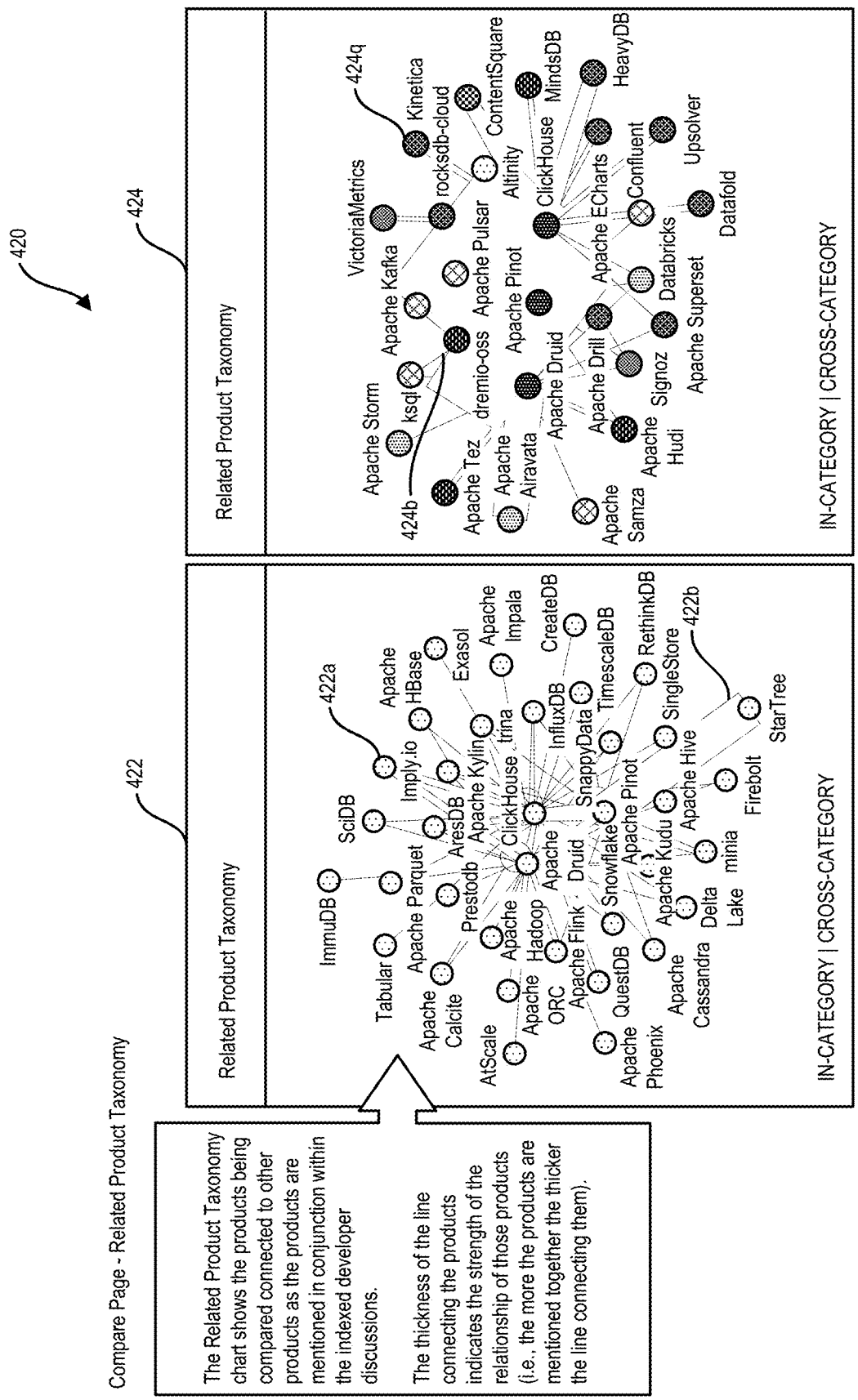
Figure 4D:
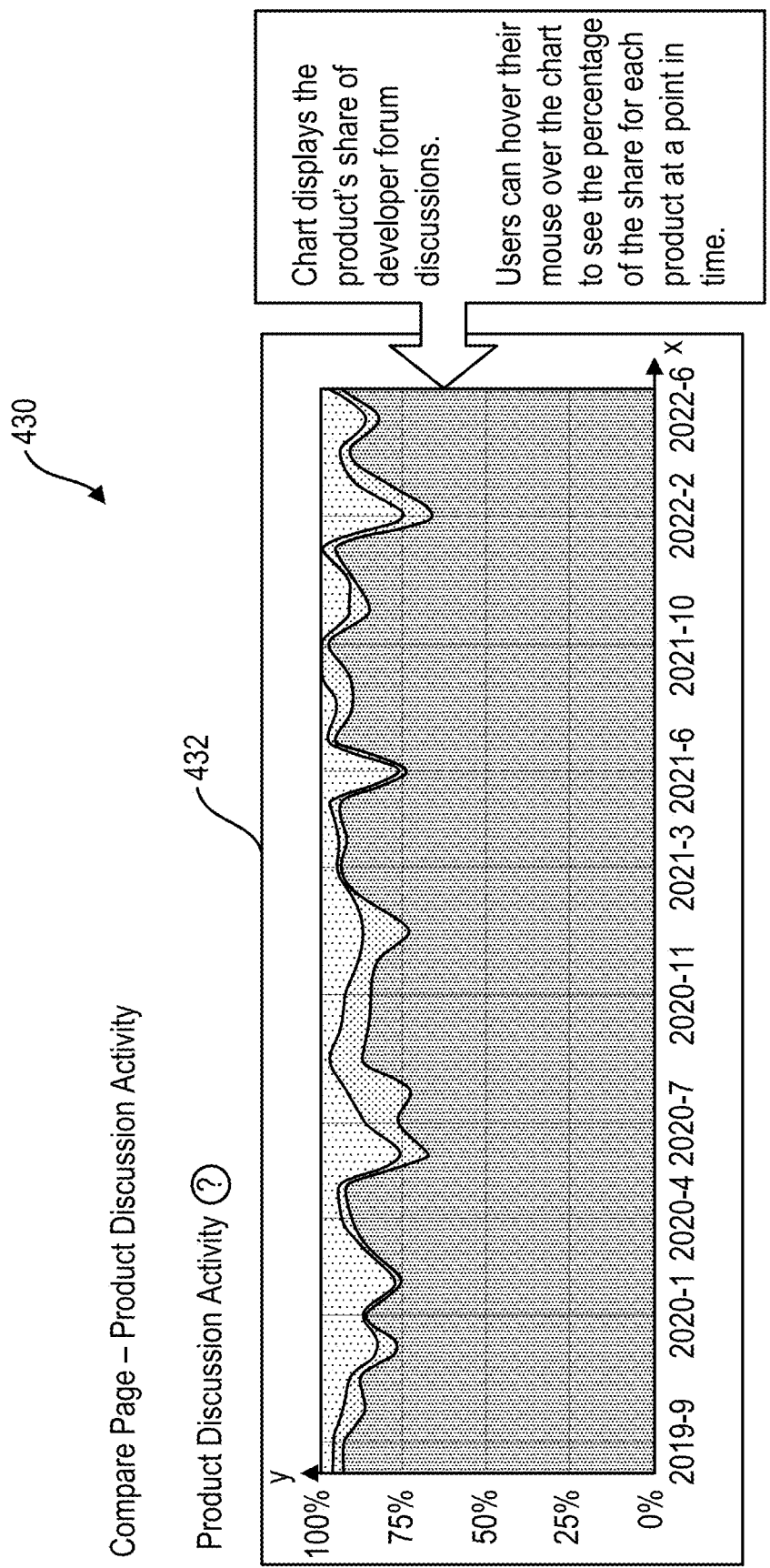
Figure 4E:
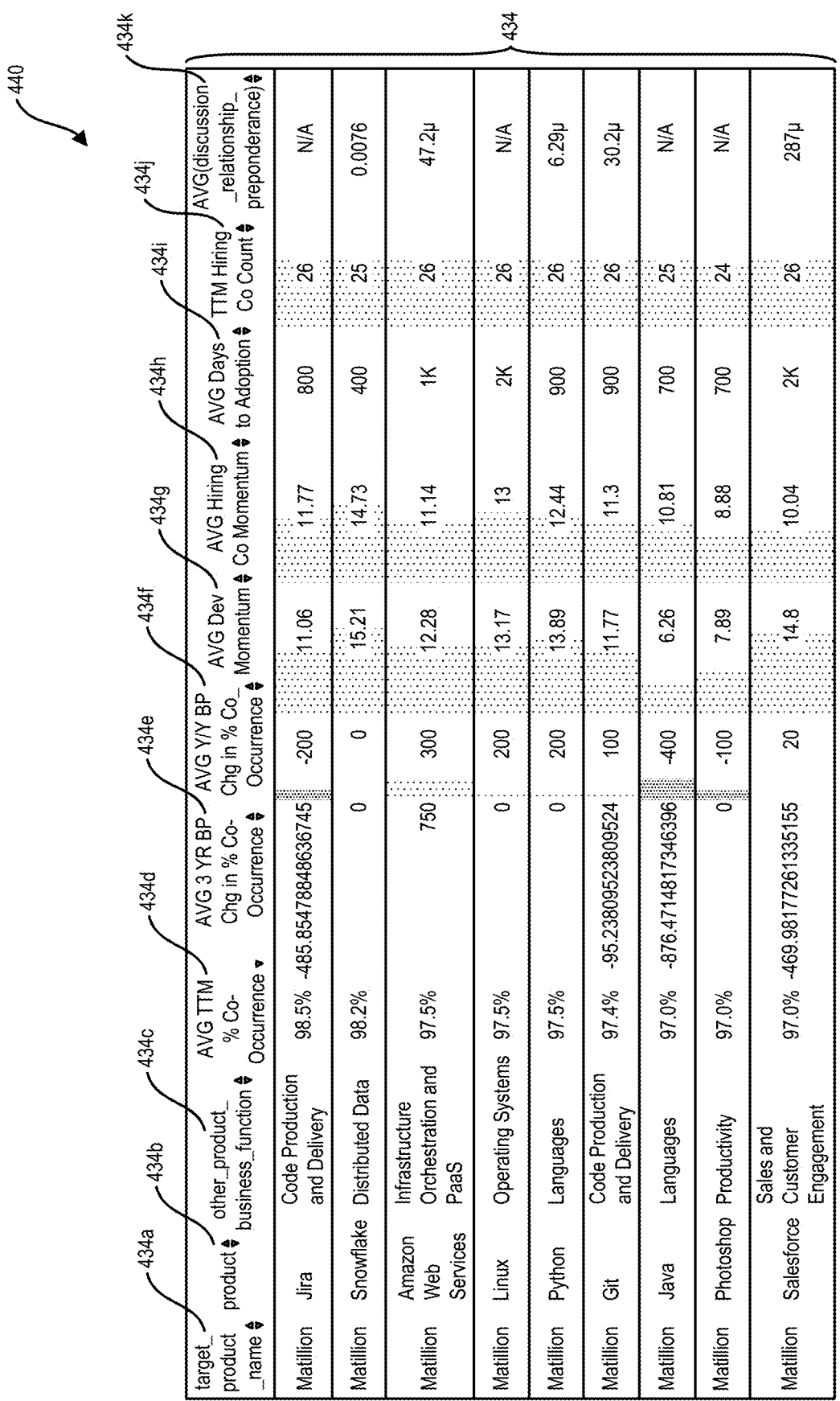

FIGS. 4A-2 through 4E show GUIs for technology product analytics in an example platform signal modeler, according to some implementations. Technology product analytics tools can include product universe visualizers, product comparison visualizers, in-category product taxonomy visualizers, cross-category product taxonomy visualizers, and/or the like. As a general overview, technology product analytics tools enable stakeholders, including developers, technology strategists, and/or investors to determine the current state and access time series data for a particular technology product. The current state and/or time series data visualizers can also enable autonomous product relationship identification and product relationship strength measurement.

FIG. 4A-2 shows aspects of a navigable product universe taxonomy 408 accessible via a user-interactive product universe visualizer 409a. In some implementations, the product universe visualizer 409a is generated by a visualizer 136 communicatively coupled to or included in the taxonomy generator 150 of FIG. 1B. As shown, the product universe visualizer 409a includes a plurality of nodes 409b. In some implementations, the nodes 409b represent various technology products. The size of each of the nodes 409b can be set to be proportional to a particular product's momentum (e.g., product momentum index) or another suitable value. Product interrelationships, represented by connectors 409c connecting the nodes 409b, can refer to complementary products (e.g., products typically used together) or substitute products (e.g., products that can be used as alternatives). The thickness value (e.g., in pixels or as a selection from a range, such as 1-10) of a particular connector 409c can be automatically set based on the determined strength of a particular product relationship. The color of a particular node 409b or a group of nodes 409b can represent the function or component group (e.g., a component (12n, 14n, 16n) or component group (12, 14, 16) of FIG. 1A) of a particular product or group of products (e.g., applications 16a, such as HR software, financial software, enterprise resource planning software, infrastructure management software, database management software, and/or the like). In some implementations, users can hover over, double-click, double-tap and/or long press on a particular node 409b in order to cause the platform signal modeler to visualize additional information about the product represented by the node. For example, the additional information can include pop-up or overlay windows configured to display items 414, 416, 422, 424, 432, and/or 434 of FIGS. 4B-4E. The displayed items can be parametrized, at run-time, to visualize the items 414, 416, 422, 424, 432, and/or 434 for a product that corresponds to the selected node 409b.

FIG. 4B shows aspects of a product comparison visualizer 410. As shown, the product comparison visualizer 410 includes a modifiable comparison toolbar 412. The modifiable comparison toolbar 412 is configured to allow a user to search for and select, via the add comparison control 412a, particular products 404a to add to a comparison set. As shown, a product comparison set can include a visualizers for various product attributes, such as a product traction visualizer 414 and/or a product taxonomy visualizer 416.

The product traction visualizer 414 is configured to calculate and/or access, via the indexer 140 and/or taxonomy generator 150, time-series data that includes a developer traction index for each product. The product traction visualizer 414 can include a two-dimensional graph that shows, along the x-axis, the time series, and along the y-axis, a count of unique developer interactions, code contributions, and/or product mentions. The product traction trendlines 414a visualize the time series data in graph form.

The product taxonomy visualizer 416 is configured to visualize relationships among related and/or complementary products, as discussed, for example, in relation to FIG. 4C.

FIG. 4C shows aspects of a related product taxonomy visualizer 420. The related product taxonomy visualizer 420 shows how particular products (422a, 424a) in a comparison set relate to other products based on, for example, counts or other metrics relating to product mentions on developer discussion boards, hiring activity, and/or individual developer activity. As shown, the related product taxonomy visualizer 420 can include an in-category visualizer 422 and/or a cross-category visualizer 424. The in-category visualizer 422 can be configured to show products 422a within a category, such as product function, component (12n, 14n, 16n), or component group (12, 14, 16) of FIG. 1A. For instance, the in-category visualizer can display front-end framework 12a products, front-end developer components 12, and so forth. The cross-category visualizer 424 can be configured to show products 424a across functions, components (12n, 14n, 16n), or component groups (12, 14, 16) of FIG. 1A. For example, assuming a particular front-end framework 12a product (e.g., JQuery) runs on particular operating systems 14b (e.g., Windows, Mac) and supports particular programming languages 14c (e.g., JavaScript), the cross-category visualizer 424a can visualize these items and their relationships. The thickness of connectors 424b, which represent product 424a relationships, can be programmatically set, for example, based on a count of times the products are mentioned together over a particular time period, or based on another suitable metric.

In some implementations, for example, the thickness of connectors (taxonomy bindings) (422b, 424b) that show product relationships can be determined based on an augmented synthetic signal. For example, semantic distance between product mentions can be used to generate a weight factor (e.g., on a scale of 0.0 to 1.0), which can be applied to the count of product mentions in the same post. Accordingly, if two products are mentioned in the same clause, in the same sentence, or within a predetermined semantic distance, the weight factor (and, therefore, the calculated thickness of the connectors (422b, 424b)) can be higher relative to that of two products mentioned in different paragraphs of the same post, or in different posts by the same developer.

In some implementations, the visualizers can include drill-down controls, which can allow a subscriber to navigate to a detailed view regarding a particular aspect of the chart, such as a product relationship. For instance, a subscriber can click or tap on a the connectors (422b, 424b) between products to navigate to a drill-down view, such as that of FIG. 4E.

FIG. 4D shows aspects of a product discussion activity visualizer 430. As shown, a product discussion activity visualizer 430 includes a digital map 432. The digital map 432 can be generated at run-time for the products included in a particular comparison set. The digital map 432 can include, for example, time series data (plotted along the x-axis) showing each product's share (plotted along the y-axis) of developer product discussions. In some implementations, a separate digital map 432 is generated for each determined developer sentiment category by, for example, using keywords and/or synonym ontologies, such as "happy"/"satisfied", "unhappy"/"unsatisfied", etc.

In some implementations, a particular digital map 432 can show the relative share of discussions corresponding to a particular sentiment category for a particular product. In some implementations, a user can hover over, double-click, double-tap and/or long press on a particular area within the digital map 432 to reveal further information about the underlying product without navigating away from the user interface.

FIG. 4E illustrates aspects of product co-occurrence visualizations, which can be thought of as a relationship between metrics related to adoption of a first technology product 434a and a second technology product 434b. The relationship can be determined using the collected job listing signals and/or other suitable items. According to various implementations, analysis of co-occurrence 434d and of the changes in a particular co-occurrence relationship over time (434e, 434f) provides insight into various aspects of product relationships, such as, for example, how the adoption of two specific technology products may be increasing or decreasing. These metrics can enable identification of important (foundational) product relationships with high co-occurrence and positive days to adoption, identification of adjacent products that could represent future competitive and/or partner products that would provide tailwinds or headwinds to growth, identification of potential sales prospects, and/or automated product development prioritization (e.g., based on identification of products that have a high co-occurrence index, high and increasing developer usage momentum, and/or are relevant to particular business functions).

Items and metrics of FIG. 4E can be generated, for example, by the product ecosystem modeler 108b of FIG. 1B. The product ecosystem modeler 108b can identify, via platform signal modeling, a set of informational items, which can include products (434a, 434b). The product ecosystem modeler 108b can determine semantic distances between the informational items in order to adjust the weight factors for the calculated metrics. The product ecosystem modeler 108b can, further, cause the foundational modeling engine 120 to generate synthetic signals and/or vectorize the signals. For example, synthetic signals can be generated to identify categories for the informational items, classify unknown/new informational items and so forth. Using the vectorized signals, the product ecosystem modeler 108b can cause the application modeler engine 130 to apply subscriber- and/or model-specific configuration settings, such as tunable thresholds, tunable parameters (e.g., quantity of informational items to consider), tunable definitions for relationship strength quantifiers (e.g., tunable definitions for weight factors), tunable definitions for identifying top developer cohorts (e.g., based on post counts, number post upvotes, number of code fork counts) for momentum calculations, and so forth. The application modeler engine 130 can apply the configuration settings to the vectorized signals and/or synthetic signals to produce output values and computations, such as items 434d-434k.

Figure 5A:
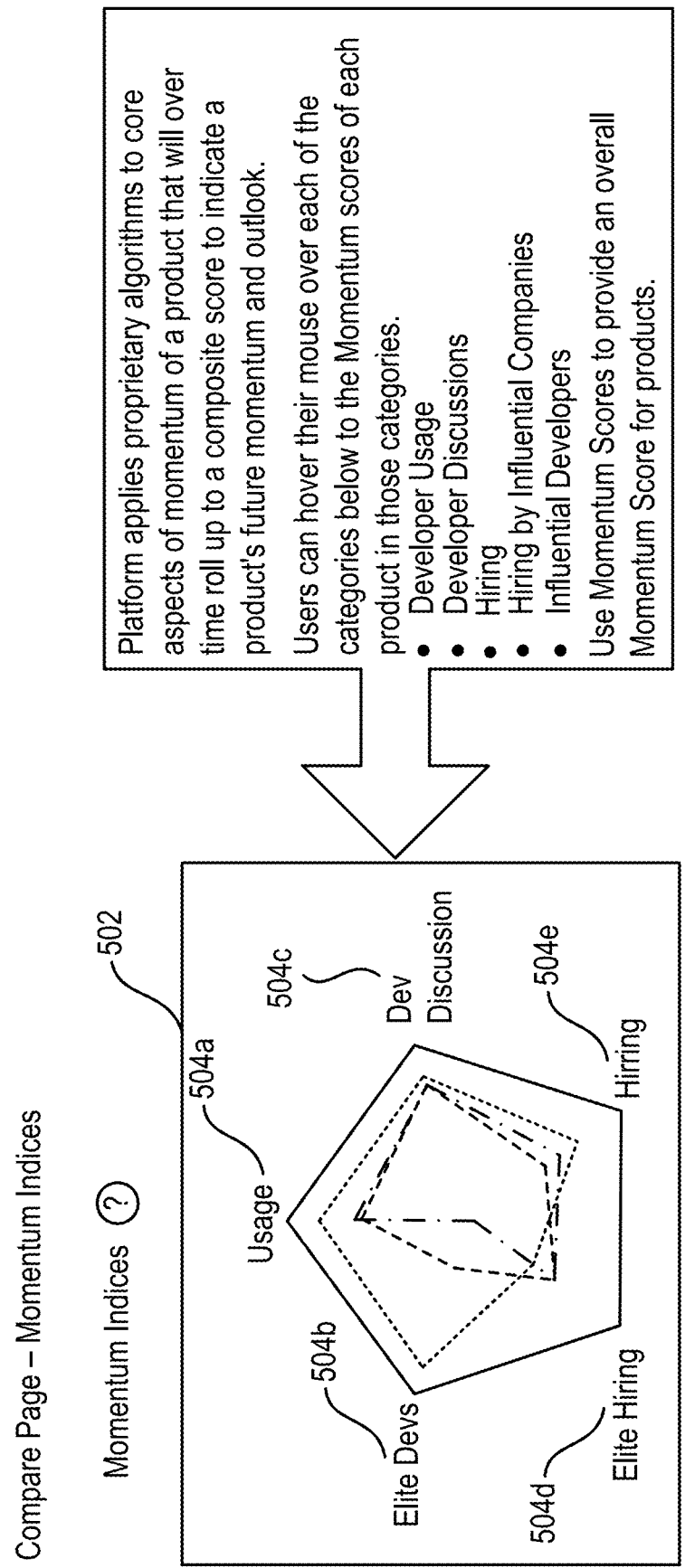
FIGS. 5A-5C show GUIs for momentum index interactions in an example platform signal modeler, according to some implementations.
Figure 5B:
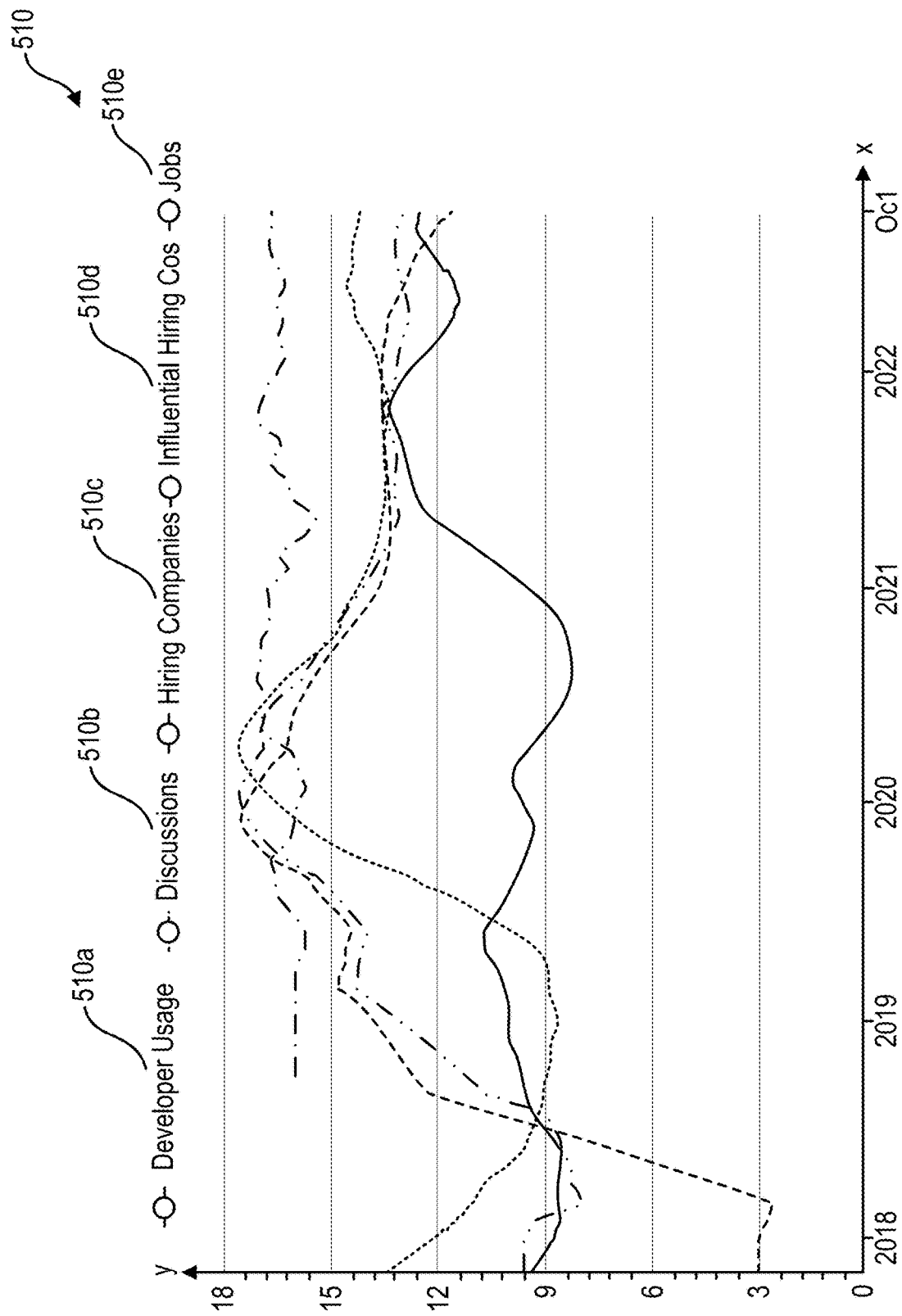
Figure 5C:
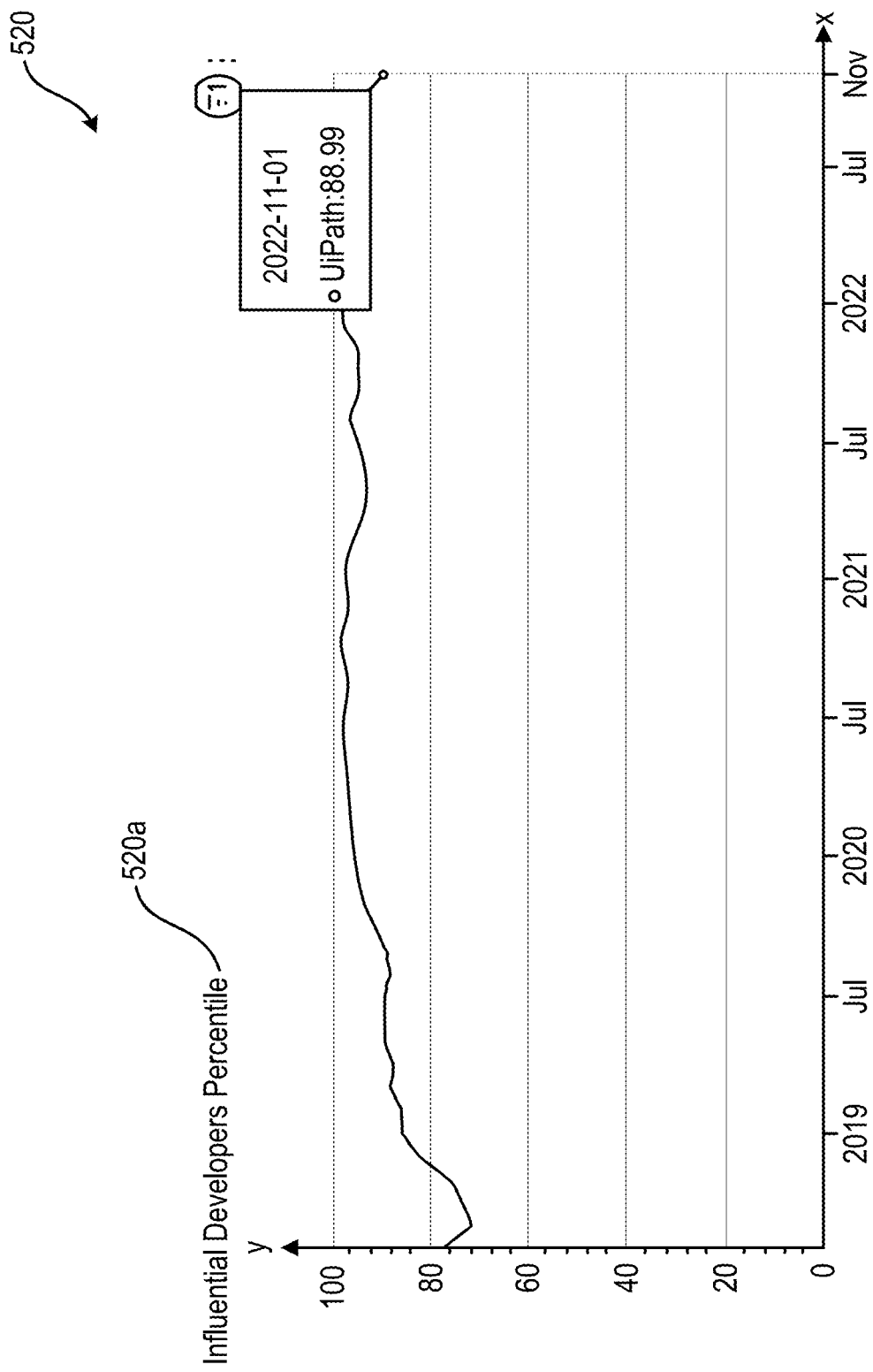

FIGS. 5A-5C show aspects of a momentum index visualizer 500 in an example platform signal modeler, according to some implementations. As a general overview, a momentum index visualizer 500 enables stakeholders to generate a multidimensional momentum map 502. The multidimensional momentum map 502 includes calculated and/or generated items 504a-504e, which correspond to various aspects of product data determined by the engines of the platform signal modeler 108 based on synthetic data signals generating using the raw signals and/or data received or acquired by the extraction engine 110. The aspects of product data can include, for example, product usage data 504a, elite developer data 504b, developer discussion data 504c, elite hiring data 504d, and/or general hiring data 504e. In some implementations, values for momentum dimensions (504a-504e) can be adjusted using, for example, weight factors (e.g., on a scale of 0.1-1.0).

The momentum index can be a fixed-length and/or variable-length floating-point value (e.g., 0.00-1.00; 0.00-20.00) or an integer value (e.g., 0-10, 0-20, 0-100). The product usage data 504a can be generated, for example, by generating counts of product mentions (e.g., within a predetermined, tunable semantic distance and/or context window) in conjunction with certain action keywords 198a (FIG. 1E), such as "use", "implemented" and the like. The elite developer data 504b can be generated, for example, by generating counts of product 194 (FIG. 1E) mentions (e.g., within a predetermined, tunable semantic distance of the action keywords and/or context window) by top N developers, where N can be a tunable threshold. The developer discussion data 504c can be generated, for example, by generating counts of product 198b (FIG. 1E) mentions (e.g., within a predetermined, tunable semantic distance and/or context window) in conjunction with certain action keywords 198a (FIG. 1E), such as "plan", "intend", "next year", "considering" and the like. The elite hiring data 504d can be generated, for example, by generating counts of product mentions (e.g., within a tunable context window) in job postings by top N companies, where N can be a tunable threshold. The general hiring data 504e can be generated, for example, by generating counts of product mentions (e.g., within a tunable context window) in job postings.

As shown, for each particular product in a comparison set, the points 504a-504e can be connected to define a two-dimensional surface area. A plurality of differently-colored two-dimensional surface areas can be overlayed to show, via a single user interface, the relative strength of each product across each of the multiple dimensions. In some implementations, a user can hover over, double-click, double-tap and/or long press on a particular area within the multidimensional momentum map 502 to reveal the relevant scores and/or underlying data for each product without navigating away from the user interface. As shown in FIG. 5B, the momentum index and its components (504a-e and/or 510a-510e) can be viewed in a time series chart 510 to highlight inflections and changing relationships between the components over time. As shown in FIG. 5C, influential developer percentiles 520a can be shown in a series.

One of skill will appreciate that the momentum map 502 can be implemented in a variety of ways, the number of vertices and, more generally, dimensions on the map can vary, the visual emphasis techniques can include color, opacity, fill level, and so forth. For example, the momentum map 502 can include any suitable graphical components, including shapes, icons, bars/columns, trendlines and so forth. According to various implementations, the momentum map 502 can include a bar chart, a pie chart, a linear plot, a scatter plot, a frequency table, a frequency diagram, and so forth. Furthermore, in some implementations, the momentum map 502 can include tabular and/or relationally structured data (e.g., a table, dataset, a set of key-value pairs) and omit one or more visual emphasis components described herein.

Figure 6A:
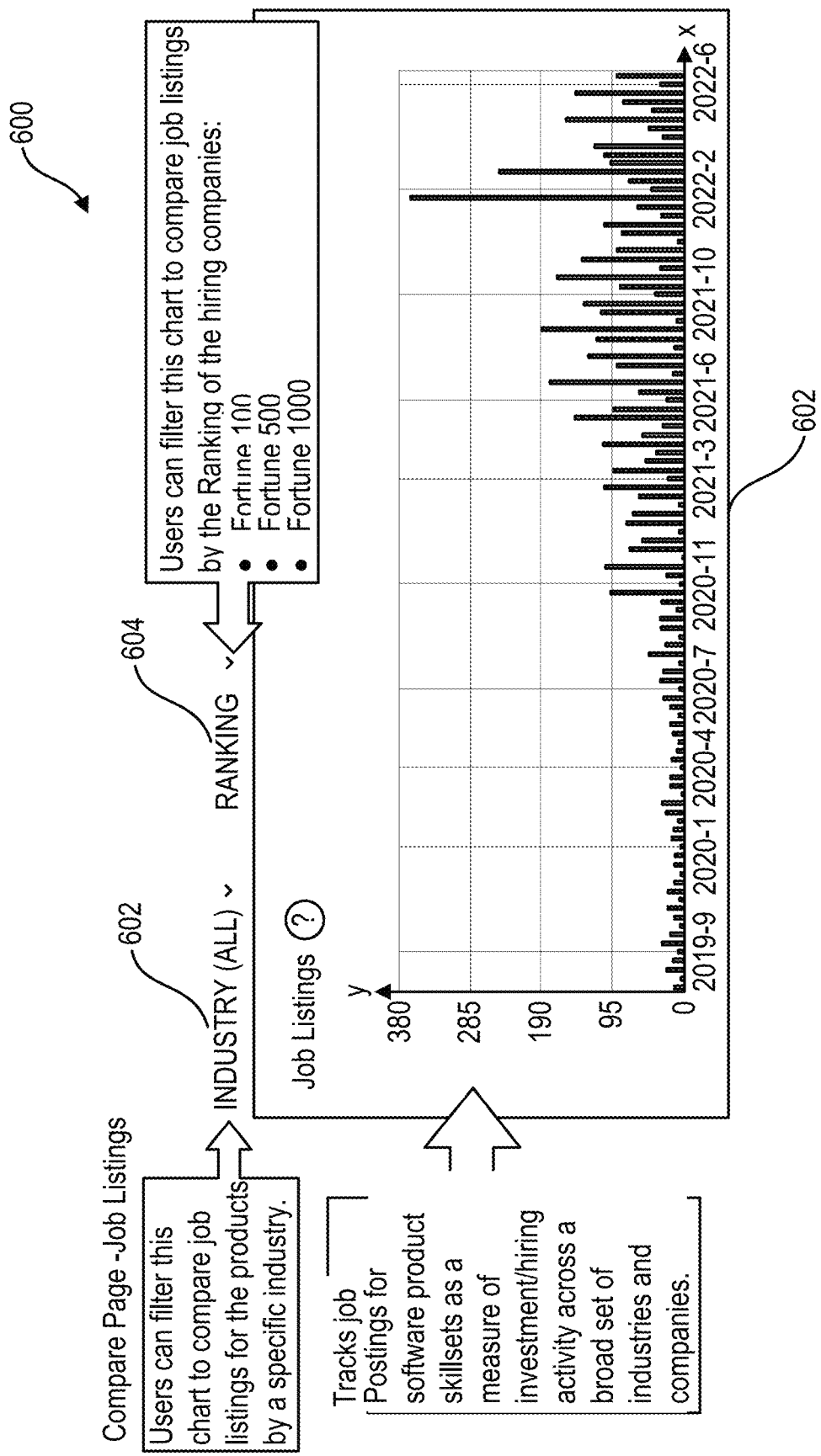
FIGS. 6A-6C show GUIs for talent pool analytics in an example platform signal modeler, according to some implementations.
Figure 6B:
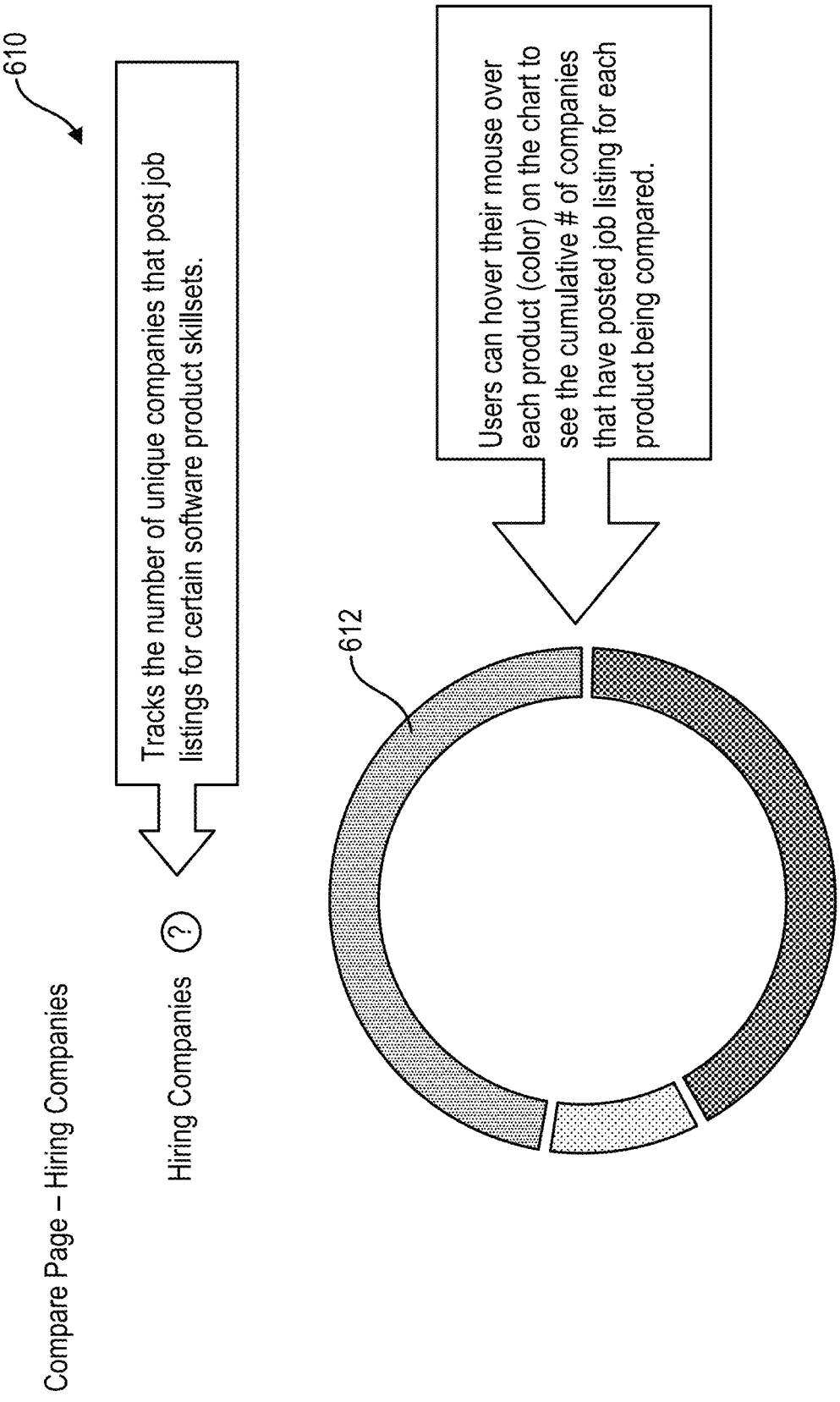
Figure 6C:
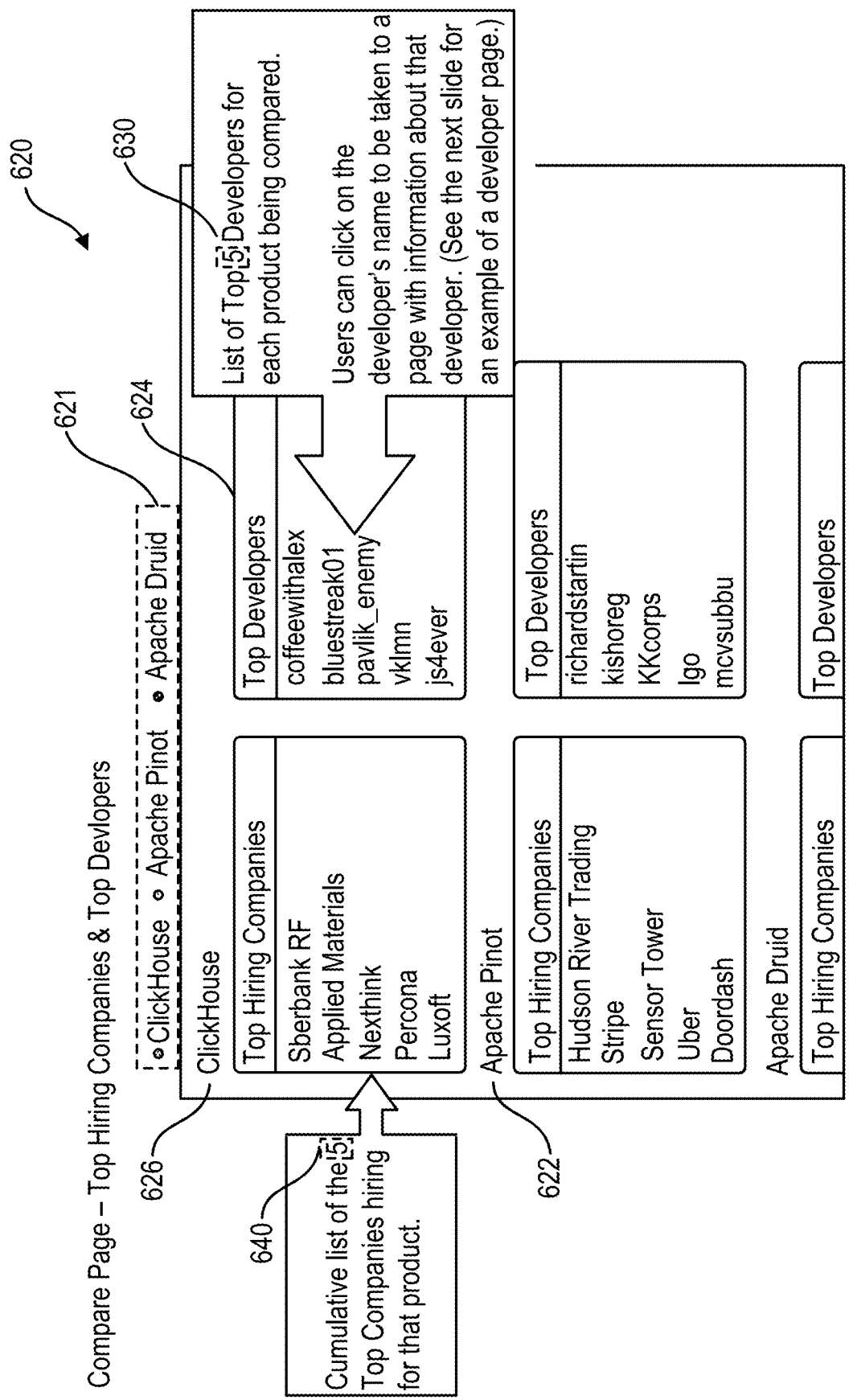

FIGS. 6A-6C show talent pool analytics tools in an example platform signal modeler, according to some implementations. Talent pool analytics tools include job listing trackers/visualizers, hiring entity visualizers, and/or developer activity visualizers. Users of the application 106 can subscribe to data feeds generated by visualizers, as shown, for example, in FIGS. 7A and 7B and discussed further herein. As a general overview, talent pool analytics tools enable stakeholders, including developers, technology strategists, and/or investors to determine the current state of the talent pool for a particular technology product. The current state data for the talent pool can also enable automatic identification of experts in a particular technology product and/or product category (e.g., based on product mentions, upvotes, and so forth). The developer clout score can be calculated, for example, by determining how influential a developer is in a particular product area (e.g., by determining the number of post counts, number post upvotes, number of code fork counts), which can be weighted and/or associated with a particular context window, either of which can be tunable.

FIG. 6A shows aspects of a job listing visualizer 602. The job listing visualizer 602 tracks job postings for a particular selected product skillset and presents data in a time-series fashion. In some implementations, the time series data is grouped by a hiring entity attribute, such as company category, company rank, and/or the like. In some implementations, users can filter the time series data by industry or according to other suitable criteria. In some implementations, data can be filtered by industry 602 and/or ranking 604. The data can be grouped by item 606, which can be a skillset, product, and/or another suitable keyword or identifier.

FIG. 6B shows aspects of a hiring company visualizer 610. The hiring company visualizer 610 can include a visual indicator 612 configured to track the number of unique hiring entities that post job listings for certain product skillsets for a particular selected product. In some implementations, a user can hover over, double-click, double-tap and/or long press on a particular area within the visual indicator 612 to reveal the underlying data without navigating away from the user interface.

FIG. 6C shows aspects of top M hiring companies (where the M 640 can be tunable) and top developers visualizer. In some implementations, instead of or in addition to product names (622, 626), product groupings (e.g., "cloud providers") can be used. The product names (622, 626) and/or groupings can have associated therewith sets of top N 630 developers 624, where the N can be tunable.

Figure 7A:
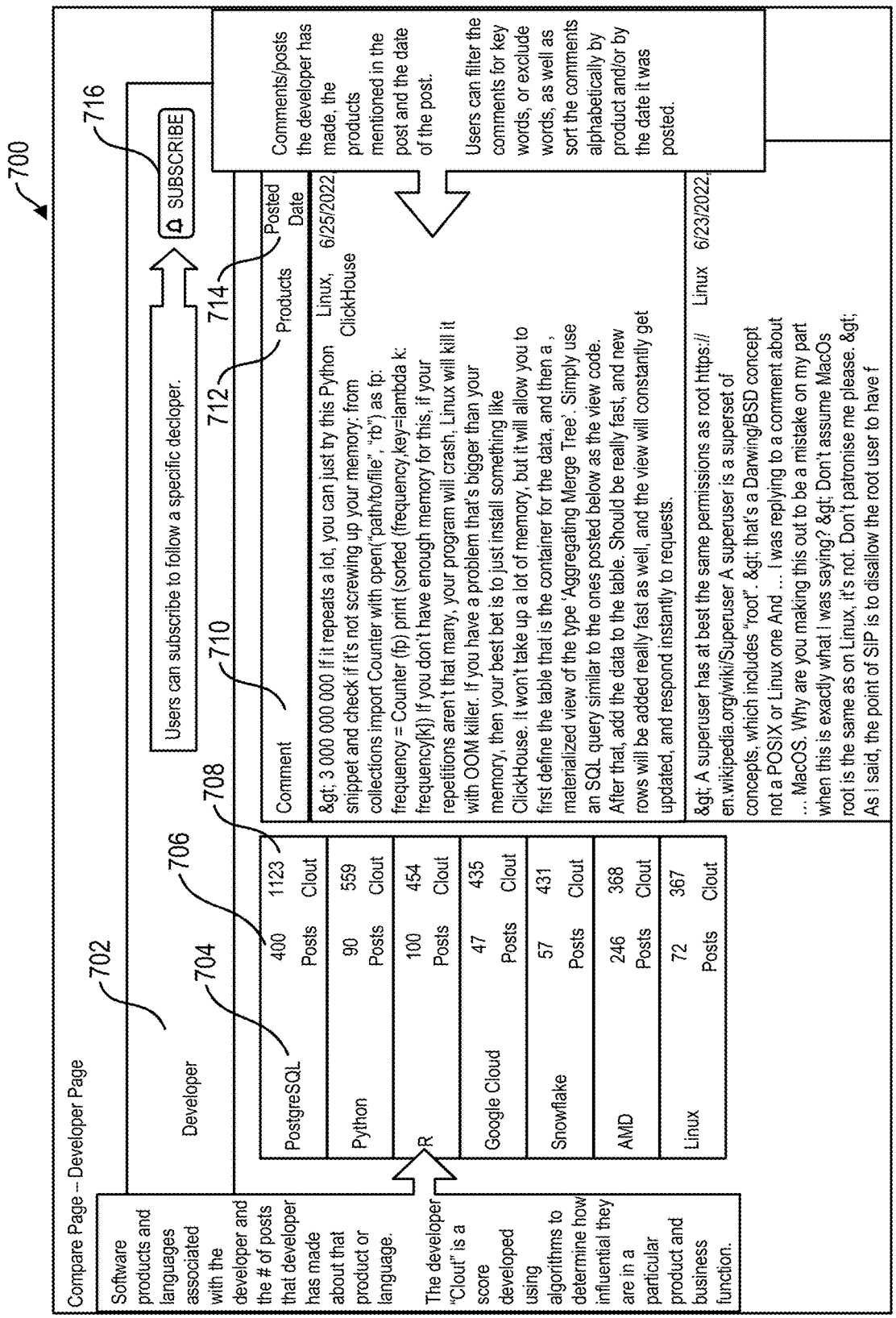

FIGS. 7A and 7B show GUI for user subscription management in an example platform signal modeler, according to some implementations. As a general overview, users of the application 106 can subscribe to data feeds generated and/or used by various visualizers. Subscribing to a data item generated and/or used by a particular visualizer allows a user to access relevant aspects of unstructured data from a plurality of separate systems via a single user interface.

For instance, as shown in an example implementation of FIG. 7A, a user can subscribe 716 to a data feed regarding a particular developer 702. The data feed regarding a particular developer 702 can include the developer's product mentions 704, related posts 706, and/or a developer clout score 708. The developer clout score can be generated by the foundational modeling engine 120 and can allow a user to determine how influential a developer is in a particular product area based on, for example, a developer's product mention 704 analytics. As shown, the data feed regarding a particular developer 702 can include a plug-in widget, which can display the developer's comments 710 associated with a particular product mention 704 and its associated products 712, posted date 714 and/or other relevant attributes. In some implementations, the plug-in widget is populated at run-time by, for example, generating a function call and/or a URL to a resource on a particular source computing system 102 where the extraction engine 110 obtained the relevant information. In some embodiments, data elements in the plug-in widget are searchable such that the developer's comments 710 can be filtered by keyword, date, and/or according to other suitable criteria.

As shown in an example implementation of FIG. 7B, a user can navigate to a followed product and/or developer page, where the user can see, in a single user interface, top N products followed 722 and top N developers followed 724. In some implementations, the value of N is automatically determined by determining the maximum number of rows that can be accommodated by the display without adversely impacting readability and displaying the corresponding number or fewer records from the record set. In some implementations, the value of N is tunable by subscriber or subscriber entity. According to various implementations, records in the top N products followed 722 and top N developers followed 724 result sets can be ranked according to pre-set user preferences and/or based on the value of a particular score, index, or category, such as the developer clout score, software product momentum index, and/or the like. In some implementations, a user can hover over, double-click, double-tap and/or long press on a particular area within the top N products followed 722 or top N developers followed 724 to reveal the underlying data 728 without navigating away from the user interface. The underlying data 728 can include, for example, top discussions, influential developers, performance, pricing, vulnerabilities, threats, and/or other suitable data items determined or generated by the foundational modeling engine 120 based on data sourced by the extraction engine 110.

Example Computer System

Figure 8:
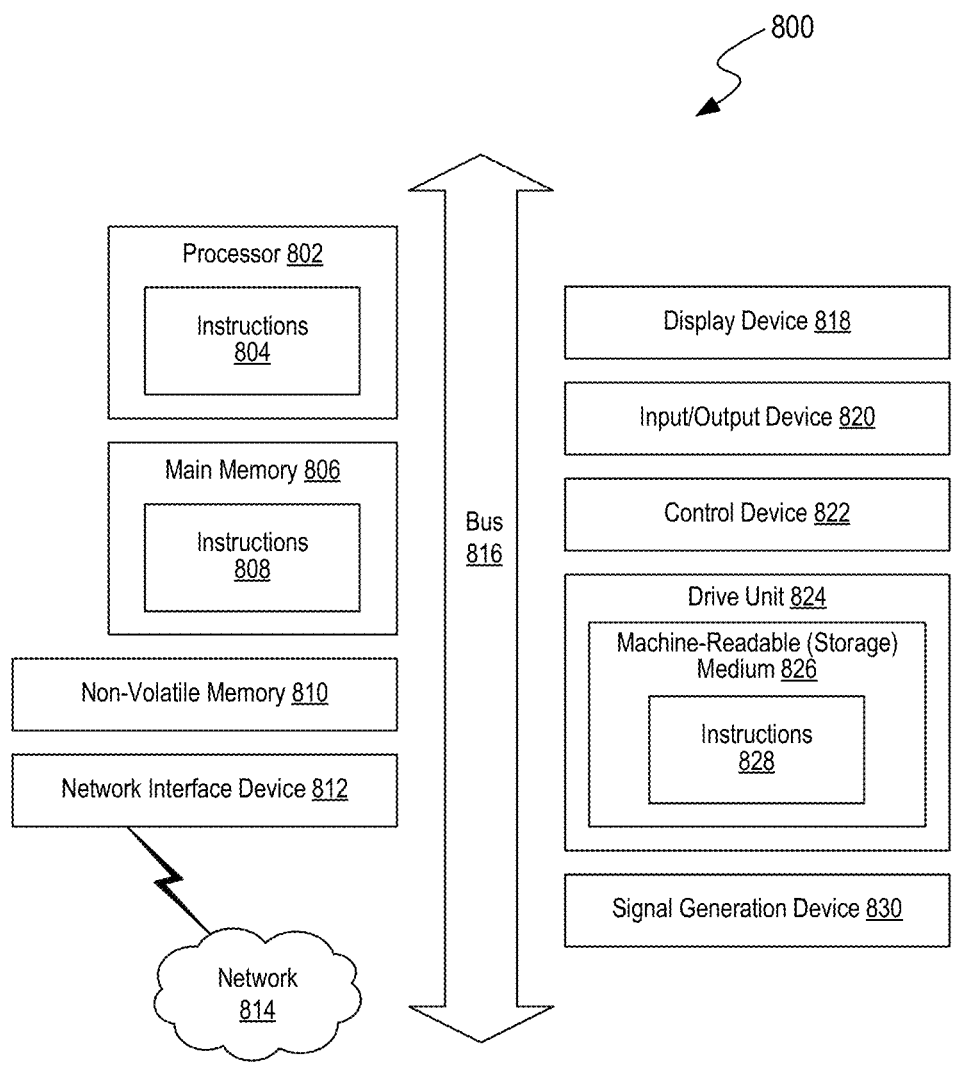
FIG. 8 is a system diagram illustrating an example of a computing system in which the disclosed platform signal modeler operates, according to some implementations.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computer system 800 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 800. In some implementations, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real-time, near real-time, or in batch mode.

The network interface device 812 enables the computer system 800 to exchange data in a network 814 with an entity that is external to the computing system 800 through any communication protocol supported by the computer system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computer system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computer system 800 to perform operations to execute elements involving the various aspects of the disclosure.

Example Networked Computing Environment

Figure 9:
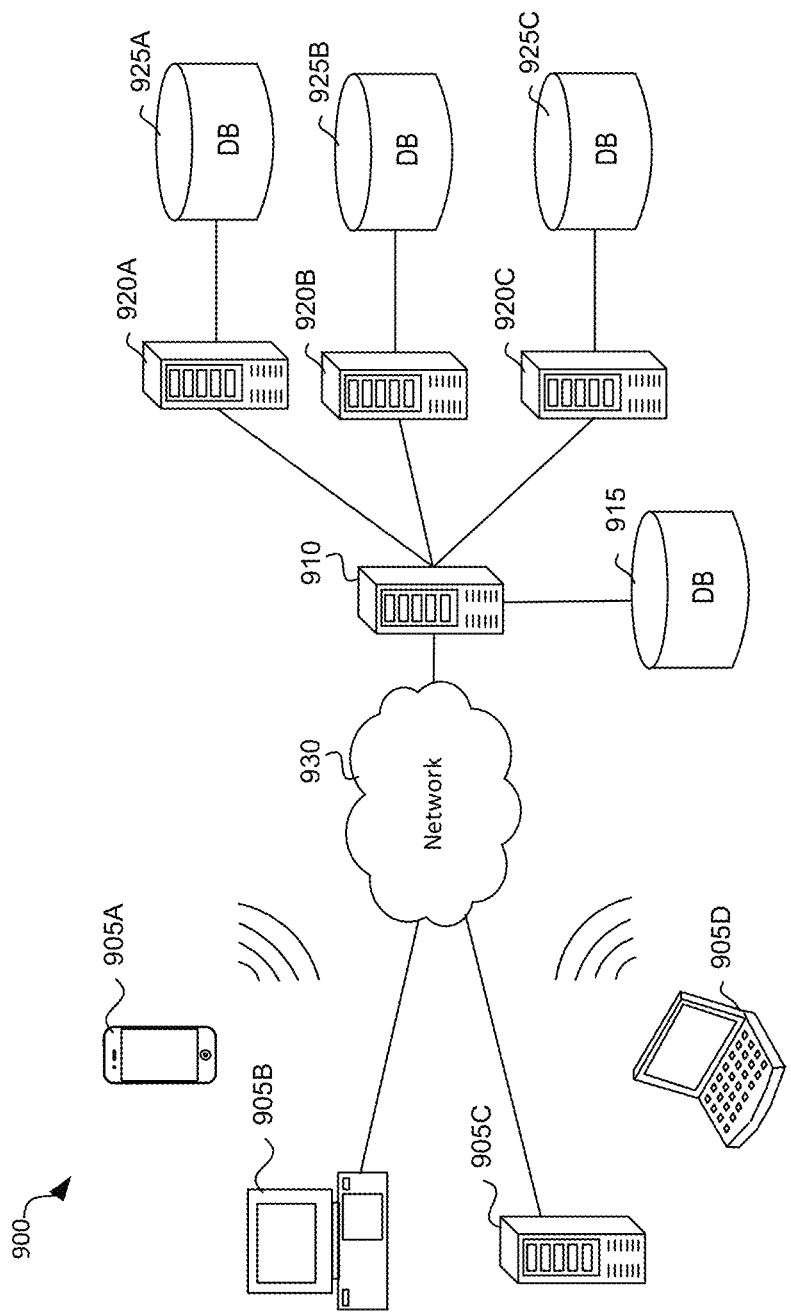
FIG. 9 is a system diagram illustrating an example of a networked computing environment in which the disclosed platform signal modeler operates, according to some implementations.

FIG. 9 is a system diagram illustrating an example of a computing environment in which the disclosed system operates in some embodiments. In some embodiments, environment 900 includes one or more client computing devices 905A-D, examples of which can host the platform signal modeler 108. Client computing devices 905 operate in a networked environment using logical connections through network 930 to one or more remote computers, such as a server computing device.

In some embodiments, server 910 is an edge server which receives client requests and coordinates fulfillment of those requests through other servers, such as servers 920A-C. In some embodiments, server computing devices 910 and 920 comprise computing systems, such as the platform signal modeler 108. Though each server computing device 910 and 920 is displayed logically as a single server, server computing devices can each be a distributed computing environment encompassing multiple computing devices located at the same or at geographically disparate physical locations. In some embodiments, each server 920 corresponds to a group of servers.

Client computing devices 905 and server computing devices 910 and 920 can each act as a server or client to other server or client devices. In some embodiments, servers (910, 920A-C) connect to a corresponding database (915, 925A-C). As discussed above, each server 920 can correspond to a group of servers, and each of these servers can share a database or can have its own database. Databases 915 and 925 warehouse (e.g., store) information pertinent to applications described herein, including input data, intermediate processing results, output data, and/or post-processing data. Though databases 915 and 925 are displayed logically as single units, databases 915 and 925 can each be a distributed computing environment encompassing multiple computing devices, can be located within their corresponding server, or can be located at the same or at geographically disparate physical locations.

Network 930 can be a local area network (LAN) or a wide area network (WAN), but can also be other wired or wireless networks. In some embodiments, network 930 is the Internet or some other public or private network. Client computing devices 905 are connected to network 930 through a network interface, such as by wired or wireless communication. While the connections between server 910 and servers 920 are shown as separate connections, these connections can be any kind of local, wide area, wired, or wireless network, including network 930 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. One or more non-transitory, computer readable media storing instructions thereon, which, when executed by at least one processor, perform operations for technology stack modeling and simulation using technology platform signals, the operations comprising:
  acquiring, from a first computing system communicatively coupled to a platform signal modeler, a first technology platform signal comprising unstructured data,
    wherein the first technology platform signal comprises a set of developer narratives related to a set of technology components;
  generating, by the platform signal modeler and using the first technology platform signal, a synthetic signal, comprising:
    executing, by the platform signal modeler, a trained natural language processing (NLP) model to generate, using the first technology platform signal, a set of technology component tokens;
    based on an aggregation of semantic distance values between a first token and a second token across the set of developer narratives,
      generating a taxonomy binding between the first token and the second token,
      determining a technology component co-occurrence value in relation to the taxonomy binding, and storing the technology component co-occurrence value in association with the taxonomy binding,
wherein the synthetic signal comprises the first token, the second token, the taxonomy binding, and the co-occurrence value; and
augmenting, using a second technology platform signal, the synthetic signal by:
acquiring, from a second computing system communicatively coupled to the platform signal modeler, the second technology platform signal comprising additional information relating to the first token,
wherein the additional information includes at least two of code repository data, vulnerability reporting data, security scorecard data, privacy scorecard data, responsible artificial intelligence (AI) scorecard data, or entity operating data; and
determining a momentum indicium for the technology component, indicated by the first token, using the second technology platform signal.

2. The one or more non-transitory, computer readable media of claim 1, the operations further comprising: including, in the synthetic signal, a classification relating to the first token.

3. The one or more non-transitory, computer readable media of claim 2, the operations further comprising performing an indexer-augmented technology component discovery by cross-referencing the first token to a previously stored technology component descriptor.

4. The one or more non-transitory, computer readable media of claim 3, the operations further comprising:
responsive to determining that no previously stored technology component is within a predetermined similarity threshold of the first token,
further augmenting the synthetic signal by storing the first token associatively with a metadata item;
generating a vectorized representation of the further augmented synthetic signal; and
using the vectorized representation of the further augmented synthetic signal, executing a trained machine learning model to determine the classification relating to the first token by comparing the vectorized representation of the further augmented synthetic signal to a set of previously stored vectors.

5. The one or more non-transitory, computer readable media of claim 1, the operations further comprising: using the synthetic signal, generating a first computer-based prediction of a particular technology stack that includes a first technology component relating to the first token and a second technology component relating to the second token.

6. The one or more non-transitory, computer readable media of claim 5, the operations further comprising: generating a second computer-based prediction of technology stack evolution for the particular technology stack.

7. The one or more non-transitory, computer readable media of claim 6, the operations further comprising: executing a regression-based model to predict a numerical change in the co-occurrence value, over a predetermined period of time, between the first token and the second token.

8. The one or more non-transitory, computer readable media of claim 7, the operations further comprising:
generating a vectorized representation of the synthetic signal;
causing a trained neural network to generate, based on the vectorized representation, a set of vectors corresponding to a set of technology components within a predetermined similarity threshold to the vectorized representation; and
for a vector in the set of vectors,
determining a corresponding technology component;
generating a training data set for the regression-based model based on the corresponding technology component; and
training the regression-based model using the generated training data set.

9. The one or more non-transitory, computer readable media of claim 1, wherein at least one of the first technology platform signal and the set of developer narratives is generated according to a tunable context window.

10. The one or more non-transitory, computer readable media of claim 1, wherein determining the momentum indicium comprises: using the second technology platform signal, determining at least one of a technology component usage metric, developer discussion metric, or hiring activity metric for the first token.

11. The one or more non-transitory, computer readable media of claim 10, wherein the momentum indicium is generated for top N entities, N being a tunable parameter, and the top N entities comprise top N developers associated with the technology component or top N companies using the technology component.

12. The one or more non-transitory, computer readable media of claim 10, further comprising generating a graphical user interface comprising a user-interactive visual representation of the momentum indicium.

13. The one or more non-transitory, computer readable media of claim 12, wherein the user-interactive visual representation comprises a drill-down control.

14. The one or more non-transitory, computer readable media of claim 1, wherein the aggregation of the semantic distance values comprises a time-weighted average.

15. A computer-based method for technology stack modeling and simulation using technology platform signals, the method comprising:
acquiring, from a first computing system communicatively coupled to a platform signal modeler, a first technology platform signal comprising unstructured data,
wherein the first technology platform signal comprises a set of developer narratives related to a set of technology components;
generating, by the platform signal modeler and using the first technology platform signal, a synthetic signal comprising:
executing, by the platform signal modeler, a trained natural language processing (NLP) model to generate, using the first technology platform signal, a set of technology component tokens;
based on an aggregation of semantic distance values between a first token and a second token across the set of developer narratives,
generating a taxonomy binding between the first token and the second token,
determining a technology component co-occurrence value in relation to the taxonomy binding, and
storing the technology component co-occurrence value in association with the taxonomy binding,
wherein the synthetic signal comprises the first token, the second token, the taxonomy binding, and the co-occurrence value; and
augmenting, using a second technology platform signal, the synthetic signal by:
acquiring, from a second computing system communicatively coupled to the platform signal modeler, the second technology platform signal comprising additional information relating to the first token,
wherein the additional information includes at least two of code repository data, vulnerability reporting data, security scorecard data, privacy scorecard data, responsible artificial intelligence (AI) scorecard data, or entity operating data; and
determining a momentum indicium for the technology component, indicated by the first token, using the second technology platform signal.

16. The computer-based method of claim 15, further comprising: including, in the synthetic signal, a classification relating to the first token.

17. The computer-based method of claim 16, further comprising performing an indexer-augmented technology component discovery by cross-referencing the first token to a previously stored technology component descriptor.

18. A computing system comprising at least one processor and one or more non-transitory computer readable media storing instructions thereon, which, when executed by the at least one processor, perform operations for technology stack modeling and simulation using technology platform signals, the operations comprising:
acquiring, from a first computing system communicatively coupled to a platform signal modeler, a first technology platform signal comprising unstructured data, wherein the first technology platform signal comprises a set of developer narratives related to a set of technology components;
generating, by the platform signal modeler and using the first technology platform signal, a synthetic signal, comprising:
executing, by the platform signal modeler, a trained natural language processing (NLP) model to generate, using the first technology platform signal, a set of technology component tokens;
based on an aggregation of semantic distance values between a first token and a second token across the set of developer narratives,
generating a taxonomy binding between the first token and the second token,
determining a technology component co-occurrence value in relation to the taxonomy binding, and
storing the technology component co-occurrence value in association with the taxonomy binding,
wherein the synthetic signal comprises the first token, the second token, the taxonomy binding, and the co-occurrence value; and
augmenting, using a second technology platform signal, the synthetic signal by:
acquiring, from a second computing system communicatively coupled to the platform signal modeler, the second technology platform signal comprising additional information relating to the first token,
wherein the additional information includes at least two of code repository data, vulnerability reporting data, security scorecard data, privacy scorecard data, responsible artificial intelligence (AI) scorecard data, or entity operating data; and
determining a momentum indicium for the technology component, indicated by the first token, using the second technology platform signal.

19. The computing system of claim 18, the operations further comprising: including, in the synthetic signal, a classification relating to the first token.

20. The computing system of claim 19, the operations further comprising performing an indexer-augmented technology component discovery by cross-referencing the first token to a previously stored technology component descriptor.

* * * * *